(12) United States Patent (10) Patent No.: US 7,788,868 B2
Pollack                                    (45) Date of Patent:     Sep. 7, 2010

(54) DEVICE AND METHOD TO PROVIDE AIR CIRCULATION SPACE PROXIMATE TO INSULATION MATERIAL

(76) Inventor: Robert W. Pollack, 55 Dunbow Dr., Chappaqua, NY (US) 10514

( * ) Notice: Subject to any disclaimer, the term of this patent is extended or adjusted under 35 U.S.C. 154(b) by 0 days.

(21) Appl. No.: 12/649,946

(22) Filed: Dec. 30, 2009

(65) Prior Publication Data

US 2010/0101153 A1    Apr. 29, 2010

Related U.S. Application Data

(63) Continuation of application No. 12/139,442, filed on Jun. 13, 2008, now Pat. No. 7,654,051, which is a continuation-in-part of application No. 11/203,354, filed on Aug. 12, 2005, now Pat. No. 7,458,189.

(60) Provisional application No. 60/634,823, filed on Dec. 9, 2004, provisional application No. 60/943,692, filed on Jun. 13, 2007, provisional application No. 61/035,360, filed on Mar. 10, 2008.

(51) Int. Cl.
  *E04B 1/70* (2006.01)
  *E04B 7/00* (2006.01)
  *E02D 19/00* (2006.01)
  *E04H 7/22* (2006.01)

(52) U.S. Cl. .................. 52/302.1; 52/302.2; 52/302.6; 52/95; 52/169.4

(58) Field of Classification Search ............. 52/302.1, 52/95, 302.3, 199, 198, 269, 302.6, 270, 52/169.14
See application file for complete search history.

(56) References Cited

U.S. PATENT DOCUMENTS 4,016,700 A    4/1977 Blomstedt
(Continued)

FOREIGN PATENT DOCUMENTS

JP    02004052245 A    2/2004
WO    WO-96/18779 A1    6/1996

OTHER PUBLICATIONS

International Search Report for PCT/US2009/047334 dated Feb. 2, 2010.

*Primary Examiner*—Richard E Chilcot, Jr.
*Assistant Examiner*—Mark R Wendell
(74) *Attorney, Agent, or Firm*—Edwards Angell Palmer & Dodge LLP

(57) ABSTRACT

Insulation spacer devices, methods and related construction techniques are provided. An exemplary device may include a body having a plurality of openings defining an openwork, to allow the passage of air therethrough when placed in contact with insulation material. The device may further include a plurality of spacer struts and/or spacing depressions fixedly attached to the body. The struts may be configured to maintain a predetermined distance between a first side of the insulation material and a building surface. The body and struts act together to define and maintain a space between the first side of the insulation material and the building surface, for example, for ventilation. The building surface can be the bottom face of a roof, an insulated attic floor, wall sheathing or a soundproofed demising wall, for example. The spacer device can be capable of being transported and stored together with, or as a separate item from, the insulation material, and can also be stored in nested layers. The device can also be stored in rolled form. The openwork of the device can additionally or alternatively include a sheet of Entangled net filaments or other similar material.

19 Claims, 13 Drawing Sheets

U.S. PATENT DOCUMENTS

| | | | |
|---|---|---|---|
| 4,189,878 A | 2/1980 | Fitzgerald |
| 4,280,399 A | 7/1981 | Cunning |
| 4,295,415 A | 10/1981 | Schneider, Jr. |
| 4,523,519 A | 6/1985 | Johnson |
| 4,660,463 A | 4/1987 | Bottomore et al. |
| 4,962,692 A | 10/1990 | Shuert |
| 4,977,714 A | 12/1990 | Gregory, Jr. |
| 4,977,721 A | 12/1990 | Blosseville et al. |
| 5,341,612 A | 8/1994 | Robbins |
| 5,489,462 A | 2/1996 | Sieber |
| 5,596,847 A | 1/1997 | Stephenson |
| 5,673,521 A | 10/1997 | Coulton et al. |
| 5,761,864 A | 6/1998 | Nonoshita |
| 5,867,957 A | 2/1999 | Holtrop |
| 6,061,973 A | 5/2000 | Accardi et al. |
| 6,308,472 B1 | 10/2001 | Coulton et al. |
| 6,557,313 B1 | 5/2003 | Alderman |
| 6,584,735 B2 | 7/2003 | Burton |
| 6,594,965 B2 | 7/2003 | Coulton |
| 6,620,040 B2 | 9/2003 | Rehbein et al. |
| 6,647,675 B1 | 11/2003 | Castellanos |
| 6,691,472 B2 | 2/2004 | Hubert |
| 6,786,013 B2 | 9/2004 | Coulton |
| 6,804,922 B1 | 10/2004 | Egan |
| 6,886,301 B2 | 5/2005 | Schilger |
| 6,991,535 B2 | 1/2006 | Ciepliski et al. |
| 7,083,147 B2 | 8/2006 | Movsesian et al. |
| 7,127,858 B2 | 10/2006 | Layfield |
| 7,137,224 B2 | 11/2006 | Rasmussen et al. |
| 7,165,369 B2 | 1/2007 | Jandl |
| 7,302,776 B2 | 12/2007 | Duncan et al. |
| 7,520,097 B2 | 4/2009 | Aalbers et al. |
| 7,607,270 B2 | 10/2009 | Ehrman et al. |
| 2003/0037499 A1 | 2/2003 | Coulton |
| 2003/0200708 A1 | 10/2003 | Parker |
| 2004/0216397 A1 | 11/2004 | Sigmund |
| 2004/0237428 A1 | 12/2004 | Headrick et al. |
| 2005/0054284 A1 | 3/2005 | Ciepliski et al. |
| 2005/0229524 A1 | 10/2005 | Bennett et al. |
| 2006/0123724 A1 | 6/2006 | Pollack |
| 2006/0277854 A1 | 12/2006 | Egan |
| 2007/0204541 A1 | 9/2007 | Sade |
| 2008/0028696 A1 | 2/2008 | Fennell |

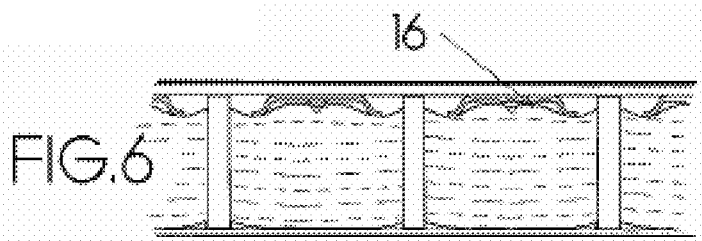
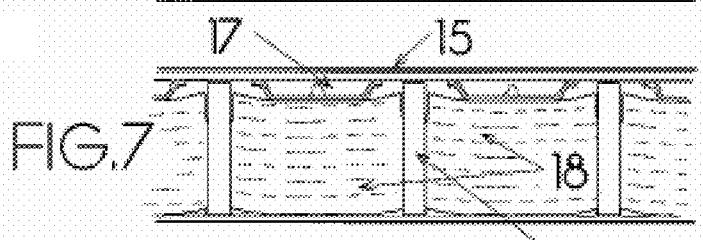
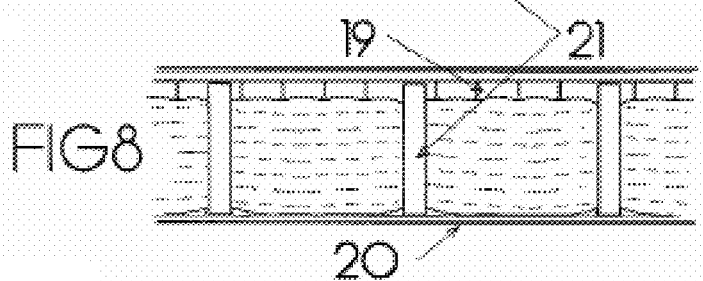
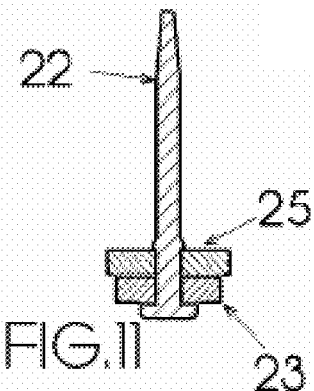
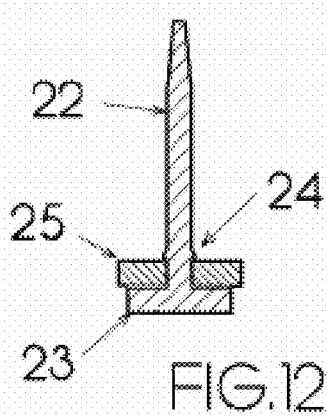
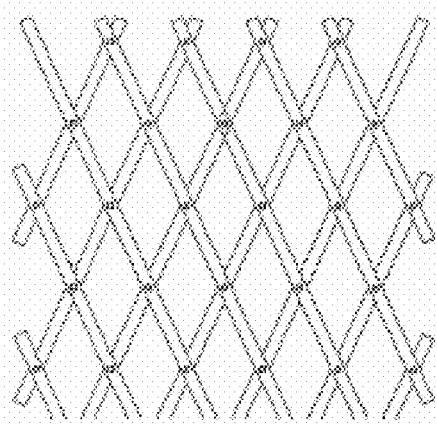
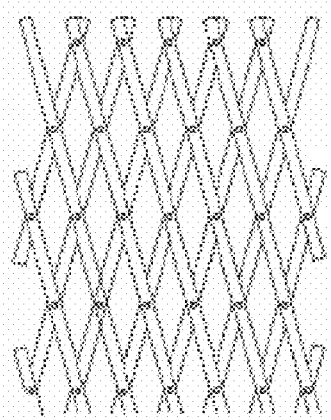

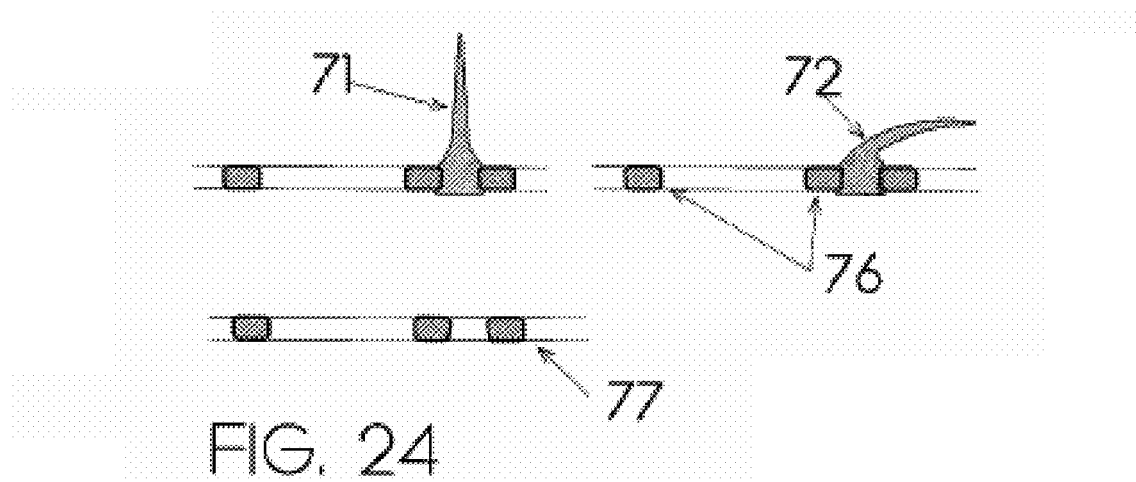
FIG. 24
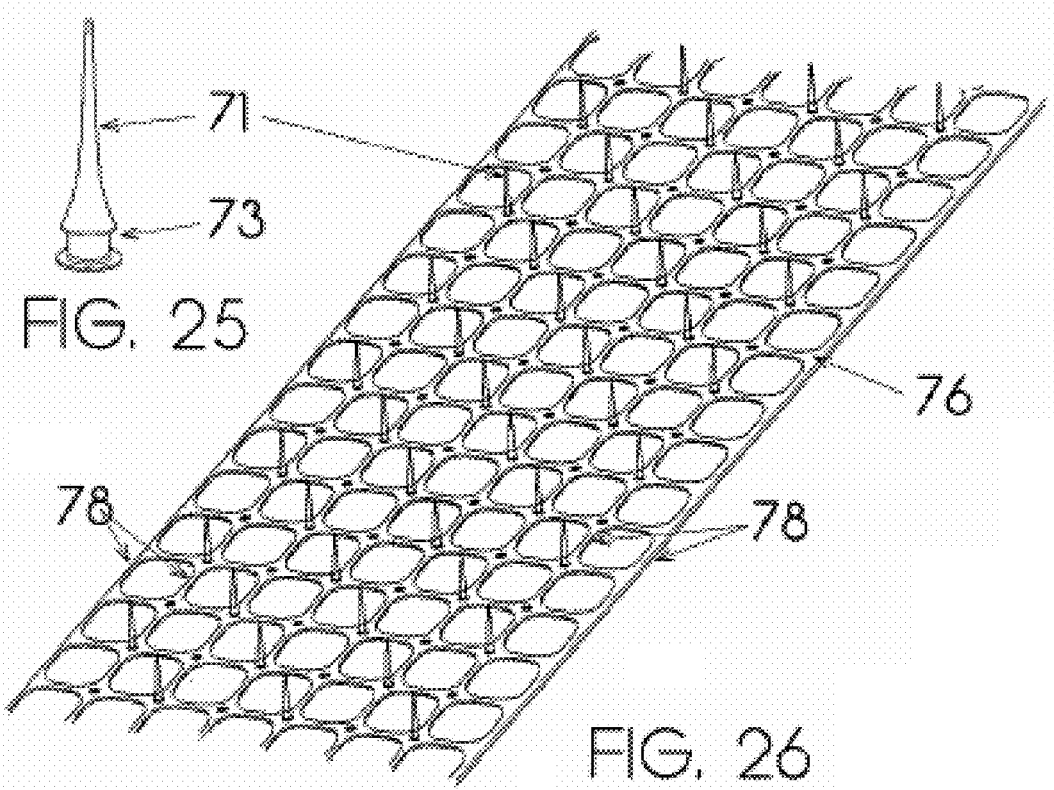
FIG. 25
FIG. 26

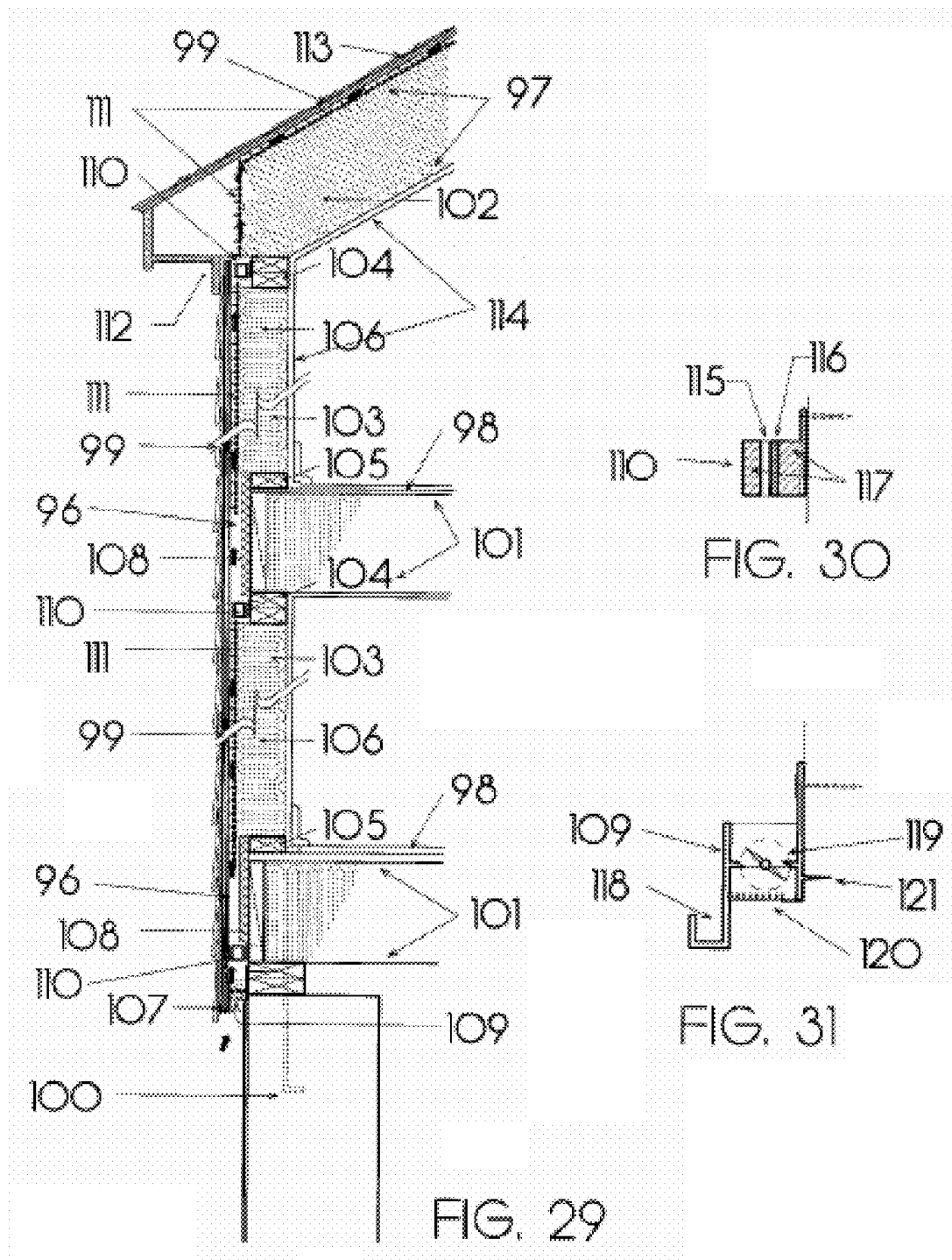

DEVICE AND METHOD TO PROVIDE AIR CIRCULATION SPACE PROXIMATE TO INSULATION MATERIAL

CROSS-REFERENCE TO RELATED APPLICATIONS

This patent application is a continuation of U.S. patent application Ser. No. 12/139,442, filed Jun. 13, 2008, which is a continuation-in-part of and claims priority to U.S. patent application Ser. No. 11/203,354, filed Aug. 12, 2005 and issued Dec. 2, 2008 as U.S. Pat. No. 7,458,189, which in turn claims the benefit of priority of U.S. Provisional Patent Application Ser. No. 60/634,823, filed Dec. 9, 2004. This patent application is a continuation of U.S. patent application Ser. No. 12/139,442, filed Jun. 13, 2008, which in turn claims the benefit of priority of U.S. Provisional Patent Application Ser. No. 60/943,692, filed Jun. 13, 2007, and U.S. Provisional Patent Application Ser. No. 61/035,360, filed Mar. 10, 2008. Each of the aforementioned patent applications is incorporated by reference herein in its entirety.

COPYRIGHT NOTICE

A portion of the disclosure of this patent document contains material which is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND OF THE INVENTION

1. Field of the Invention

The present invention relates primarily to devices and systems for maintaining air circulation space proximate to thermal or other insulation. Particularly, the present invention is directed to a device to maintain ventilation space proximate thermal insulation in order to facilitate expulsion of heat and moisture from the insulation.

2. Description of Related Art

Thermal insulation is required to reduce the energy loss from structures for the purposes of maintaining comfortable interior spaces both in heating months and cooling months. The need to reduce the consumption of fossil fuels and the "greenhouse effect" has required the ever-increasing improvement in insulation values. Dimensional lumber sizes used in the framing of structures, and standard dimensions of light steel framing members have not changed significantly in many years. The depth of framing members and therefore the insulation cavity are determined by structural requirements which, for the foregoing reason, have remained fairly constant. Exterior wall, floor and roof construction is where thermal insulation is most commonly used. The ever-increasing thickness requirements for fibrous insulation, which is the most commonly-used and economical insulation type for insulating framing cavities, makes adequate ventilation of this insulation more difficult to achieve. Increased thickness of other types of insulation for thermal or other (e.g., sound) purposes, such as certain rigid foams and the like, also present ventilation problems, particularly if the material is porous to any degree.

Insulation used in roofs has the most crucial requirement for ventilation over the top of the insulating materials. Roofs are required to have the greatest amount of thermal insulation, since as heat rises to the highest point of a space, it creates the highest differential between inside and outside temperatures of any part of the so-called "thermal envelope" and therefore is the area of the greatest heat loss during the heating season. During the cooling season, heat from the sun heats the roof to such an extent that it becomes the greatest source of heat gain. Use of dark-colored roofing materials only worsens the problem. In the heating and cooling seasons, insulation absorbs heat in the daytime as part of the insulation cycle. That heat must be expelled during the cooler night time hours to be ready to store new heat during the next daylight period, which helps slow down heat transfer through the insulation and into the structure. If ventilation is inadequate, or non-existent, the heat will not be adequately expelled from the insulation and the effectiveness of the system will be reduced. However, as the heat is expelled during the night and cools down, the insulation absorbs moisture, because the cool night air is usually relatively damp. Ventilation during daylight hours expels the moisture as the insulation is heated. If ventilation is not adequate, insulation can become completely saturated with moisture and ruin drywall, plaster and ceiling finishes, causing interior dripping and risking collapse of the ceiling. Prolonged and/or frequent water retention can also promote mildew, mold and rotting of the roof structure. In today's era of more "efficient" building technology with fewer places for air to penetrate to ventilate insulation, wet insulation and the aforementioned mildew and mold problems can become very serious, often affecting the health of occupants exposed to the mold. If mold is present in large quantities, it is sometimes referred to as "sick building syndrome."

For similar reasons, wall systems may require ventilation. Vapor barriers are often installed under drywall; or insulation batting is provided with an impermeable plastic or foil layer. However, if any part of the system is faulty, is improperly installed or becomes damaged, moisture can penetrate into the insulation and reduce its effectiveness and/or cause any of the aforementioned problems such as mold. Water and moisture can also penetrate insulation from the outside if external sheathings, sidings or wall penetrations such as windows, doors or louvers are faulty. Accordingly, proper ventilation of the insulation within wall cavities can be crucial.

A variety of methods, systems and products have been developed for attempting to maintain a ventilation space proximate to thermal insulation. However, such conventional methods and systems suffer from certain significant deficiencies.

Before legislation brought about insulation requirements for roofs, floors and exterior walls, the ventilation cavity between the top of insulation (e.g., fibrous insulation) and sheathing was formed by simply having an insulation thickness less than the void depth.

As environmental concerns brought about the creation of energy construction codes, and these codes started to require greater thicknesses of insulation, it became necessary for the insulation to be installed carefully. The practice of "patting-down" the top of the insulation during installation came about and was initially sufficient. As the thicknesses of insulation continued to increase, the Rafter-Vent® product was developed. U.S. Pat. Nos. 4,125,971, 4,406,095, 5,341,612 and 5,600,928 are examples of such existing technology. Other patents such as U.S. Pat. Nos. 4,102,092, 4,214,510, 4,446, 661 and 4,660,463 disclose devices concerned with maintaining ventilation over insulation at the eaves only, but do not maintain ventilation spaces over the entire length of the rafters.

The problems with the Rafter-Vent® and similar products are significant. FIGS. 6 and 7 illustrate this prior art product. FIG. 6 shows the Rafter-Vent® product used in a first orientation. When the Rafter-Vent® product is positioned as depicted up-side-down, the insulation can still fluff between the contact points and block most of the airflow. Nevertheless, it still provides some ventilation to the insulation. FIG. 7 shows the Rafter-Vent® product used in the opposite orientation recommended by the manufacturer for roof venting. The bottom of the "U"-shaped cross section is against the insulation. Because the bottom surface of the "U" is a solid, relatively imperforate surface and is usually stapled tightly to roof sheathing, it almost completely seals-off the insulation from the ventilation space. Additionally, because the most popularly used versions of Rafter-Vent® products are made of approximately ¼" thick styrene foam plastic, it also blocks the escape of heat via conduction from the insulation because the Rafter-Vent® product itself is an insulating material. An additional drawback to the Rafter-Vent® product is that it is supplied to a construction site in a nested bundle. Frequently, it is delivered along with the lumber in four or eight foot long bundles. Because it is fragile, very light in weight, and easily broken, and usually sits on the construction site for a long period of time before it is used, construction sites are often littered with pieces of this product. Once the bundle is opened and not carefully stored, wind can pick up the large, extremely light panels and scatter them causing litter on construction sites and the neighborhoods surrounding them.

FIG. 6 is a sectional view through several bays of roof structure and insulation illustrating use of the Rafter-Vent® product in a first orientation that would provide limited possibility for maintaining ventilation to the insulation material 16. However, as is evident from FIG. 6, tightly packed insulation can still force itself into the form of the Rafter-Vent® product and block ventilation. FIG. 7 is a sectional view through several bays of roof structure and insulation illustrating the use of the Rafter-Vent® product in a second orientation by installing it as recommended for eave vents. As is evident from FIG. 7, most of the insulation's surface area is sealed-off from the ventilation space by the Rafter-Vent® product, as noted above, because the Rafter-Vent® product is made from foam plastic, which is itself an insulator, and it effectively prevents the expulsion of built-up heat from the fibrous insulation mass.

Reference numeral 15 indicates the roof sheathing, reference numeral 18 indicates the fibrous insulation mass, and reference numeral 21 indicates a typical rafter in a "cathedral" ceiling, "tray" ceiling or flat roof assembly or attic joists with storage floor boards attached.

The Rafter-Vent® product thus has significant deficiencies because it does not insure a uniform ventilation space and because versions of it are frequently used "correctly" rendering it ineffective for the purpose that should be intended.

As briefly mentioned above, the method used prior to the advent of the Rafter-Vent® product to form the air space was the action of the insulation installer patting the insulation down with his hand. This earlier method was, to some extent, superior to the Rafter-Vent concept since airflow was not essentially completely blocked by an impermeable foam plastic layer. However, with increased thicknesses of insulation required, the "patting down" method does not work today, because it is necessary to resist the force of the compressed insulation in order to maintain the ventilation space.

Thus, as is evident from the related art, conventional methods are ineffective for maintaining an insulation space that permits adequate ventilation of insulation material. There thus remains a serious need for an efficient, simple and economic method and system for maintaining an insulation space proximate to thermal or acoustic insulation material in a building. There also remains a need for structural techniques and building designs that further facilitate the ventilation of insulation spaces. Embodiments of the present invention provide solutions for these as well as other problems.

SUMMARY OF THE INVENTION

The purpose and advantages of the present invention will be set forth in, and be apparent from, the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, in accordance with one embodiment, the invention includes a spacer device including a body having a plurality of openings defining an openwork, to allow ventilation when placed in contact with insulation material, and a plurality of struts fixedly attached to the body. The struts can be configured to maintain a predetermined distance between a first side of the insulation and an external or internal surface of a building, whereby the body and struts act to define a ventilation space between the unfaced side of the insulation and the building surface facing the insulation.

The spacer device according to the invention can be used with any type of insulated building surface, but it is especially recommended for the bottom face of a roof, an attic floor or wall sheathing, such that a ventilation space is defined between the insulation and the roof, attic floor or wall sheathing.

In accordance with still a further aspect of the invention, the device can be provided in such a form that is capable of being transported and stored as a separate item from the insulation. In accordance with a specific embodiment of the invention, the device is stored in nested layers. Alternatively, the device can be stored in rolled form.

In accordance with another aspect of the invention, a system is provided which includes the spacer device as described herein above, wherein the device is attached to the insulation material, which itself may be fibrous, rigid foam or another type of insulation. The combined spacer device or strut and insulation material construct can be packed face to face, in pairs with the spacing struts facing each other, such that the struts of one assembly penetrates through the openwork body into the insulation material of the other body in the example of fibrous insulation.

In accordance with yet a further aspect of the invention, the struts can be provided with a height of between about 0.25 and 6 inches. More preferably, the struts can be provided with a height between about 0.75 and 3 inches. Even more preferably, the struts can be provided with a height between about 1.0 and 1.75 inches. Most preferably, the struts can be provided with a height of about 1.0 and 1.5 inches.

In accordance with another aspect of the invention, the spacer struts can be formed integrally with the openwork body, or can be attached with adhesive or welded to the body using heat, ultrasonic techniques, solvent bonding, mechanical attachment such as insertion into a tight hole in the body (e.g., an interference fit), snapped or secured by an enlarged bulb in the strut or annular rings, or other forms of attachment that can resist the heat and other forces encountered during shipping, storage, deployment and use. The spacer struts, if attached to the body rather than integrally formed with the openwork body can be individual units wherein each strut is formed with an attaching pod of circular, square, or any other geometric shape, or the struts may be part of a body having a plurality of struts attached or formed thereto in the form of a strip or other geometric shape which is attached to the openwork body.

In accordance with a further aspect of the invention, the body and struts can be compressed with the attached fibrous insulation material and packaged into a rolled form. In accordance with this aspect of the invention, the struts can be bent or folded parallel to the body of the device during packaging to take up less space. Moreover, the struts can be provided with a shape memory characteristic such that the struts deploy substantially perpendicular to the body of the device when the insulation is unpackaged by a user.

In accordance with still a further aspect of the invention, a device and method of using the device as generally described herein is provided wherein the body is defined by a plurality of overlapping strips forming a crisscross, parallelogram pattern and defining openings between the strips permitting air circulation. In further accordance with this aspect of the invention, the struts can be mounted at junctures of the strips so as to act as pivot points for the strips. Having the strips pivotally attached to one another, in turn, can permit the width of the ventilation maintenance device to be adjusted to fit one or more width spaces in accordance with a method of the invention.

In accordance with still another aspect of the invention, a spacer device is provided including a body having a plurality of openings defining an openwork to allow ventilation when placed in contact with insulation material, wherein the body includes a mass of entangled rigid filaments. The body can be configured to maintain a predetermined distance between a first side of the insulation and a building surface, the body acting to define a ventilation space between the first side of the insulation and the surface. Moreover, the body can be configured into a three-dimensional form suitable for nesting multiple devices for shipping and storage. For example, the body can be formed in an accordion fashion.

In further accordance with the invention, a method is provided. In accordance with one aspect of the method of the invention, a device for maintaining an insulation space as described herein is provided, and a piece of insulation material (preferably fibrous insulation) is also provided. The method includes the steps of placing the device for maintaining the insulation space proximate to the insulation material, and installing the components into a structure such that the device for maintaining the insulation space is interposed between building structure and the insulation material to permit ventilation of the insulation. Preferably, the device is interposed between exposed fibrous insulation material and the underside of a roof sheathing or the underside of an unheated attic floor. However, the device can be interposed between the thermal insulation material and a wall structure, as desired.

In further accordance with the invention, an exemplary method is provided of packaging a device for maintaining an insulation space. The method includes providing a device as herein described, and the step of compressing the device body and struts (if provided) during the packaging process to minimize their profile for stacking or rolling. If the body and struts are pre-attached to the insulation material, they can be compressed with the attached fibrous insulation material and packaged into a rolled form. The method can alternatively or additionally include deploying the insulation material. If struts are provided on the device for maintaining the insulation space, the struts preferably deploy substantially perpendicular to the body of the device when the insulation is unpackaged by a user. Alternatively, if the device is provided in the form of an entangled netting structure, the device can be configured to be rolled up individually upon itself, or in combination with the insulation material.

In further accordance with the invention, a method of creating an embodiment of insulation spacer device (and the spacer device itself) is provided. A suitably rigid cross bar is provided having suitably rigid struts integral therewith disposed along the length of the cross bar. The cross bar is then affixed to a perforate mesh backing material that is placed in contact with an unfaced fibrous insulation mass. Preferably, the backing is flexible and distorts to permit rolling-up of the spacer device either by itself or attached to insulation.

In further accordance with the invention, a method of forming an insulation spacer for use, for example, between building sheathing and fibrous insulation is provided. Such spacer may be formed, for example, by forming depressions in sheet material or other material. The depressions are preferably about two inches across (or of other suitable dimension) and may be any shape (e.g., round, square, oval, rectangular, etc.). The depressions preferably have a depth of about 0.75 to 2.0 inches and even more preferably a depth of 1.0 to 1.5 inches. The device preferably includes perforations that may be formed in the process of making the depressions. In accordance with one embodiment, a unperforated portion (such as a land) may be formed in the bottom of each depression that is adapted and configured to contact the inside of roof or wall sheathing (or other surface) wherein the device may be attached to the sheathing with staples, nails or other suitable means. The depressions may be spaced from one another in any desired pattern and distance. In accordance with one embodiment, about four depressions may be formed within a one-square foot area of the device. Preferably, the spacing of the depressions is in a uniform pattern to facilitate stacking of a plurality of such devices for storage and shipment. Advantageously, such embodiments facilitate attachment to structural components of the building thereby facilitating their handling and use.

In further accordance with the invention, a method of utilizing insulation spacing devices as described herein in interior partitions treated with fibrous acoustical insulation such as in demising partitions between building tenants is also provided. In accordance with such method, the device may be employed in similar fashion to thermal insulation applications. The body of the spacer device may be placed against the fibrous blanket and the points of the spacer struts or equivalent structure may contact the inside face of the wallboard. This application could be used on one or both sides of the fibrous blanket, forming a void or voids that permit the pulling of wires subsequent to construction of the partition.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the methods and systems and devices of the present invention. Together with the description, the drawings serve to explain the principles of embodiments of the invention.

BRIEF DESCRIPTION OF THE DRAWINGS

FIG. 6 is a sectional view through several bays of roof structure and insulation illustrating the prior art Rafter-Vent product used in a first orientation not recommended by the manufacturer.

FIG. 7 is a sectional view through several bays of roof structure and insulation illustrating the prior art Rafter-Vent product used in a second orientation recommended by the manufacturer.

FIG. 8 is a sectional view through several bays of roof structure and insulation illustrating use of a device made in accordance with the invention.

FIGS. 9 and 10 illustrate the embodiment of FIG. 3 in various width adjustments.

FIGS. 11 and 12 each illustrate different embodiments of a portion of a device made in accordance with the embodiment of the invention shown on FIG. 3 and FIGS. 9 and 10.

FIGS. 24-26 depict views of a seventh embodiment of a ventilation spacer device made in accordance with the invention.

FIGS. 29-31 depict an exemplary building construction illustrating the ventilation of exterior walls in accordance with certain aspects of the invention.

DETAILED DESCRIPTION OF THE PREFERRED EMBODIMENT

Figure 1:
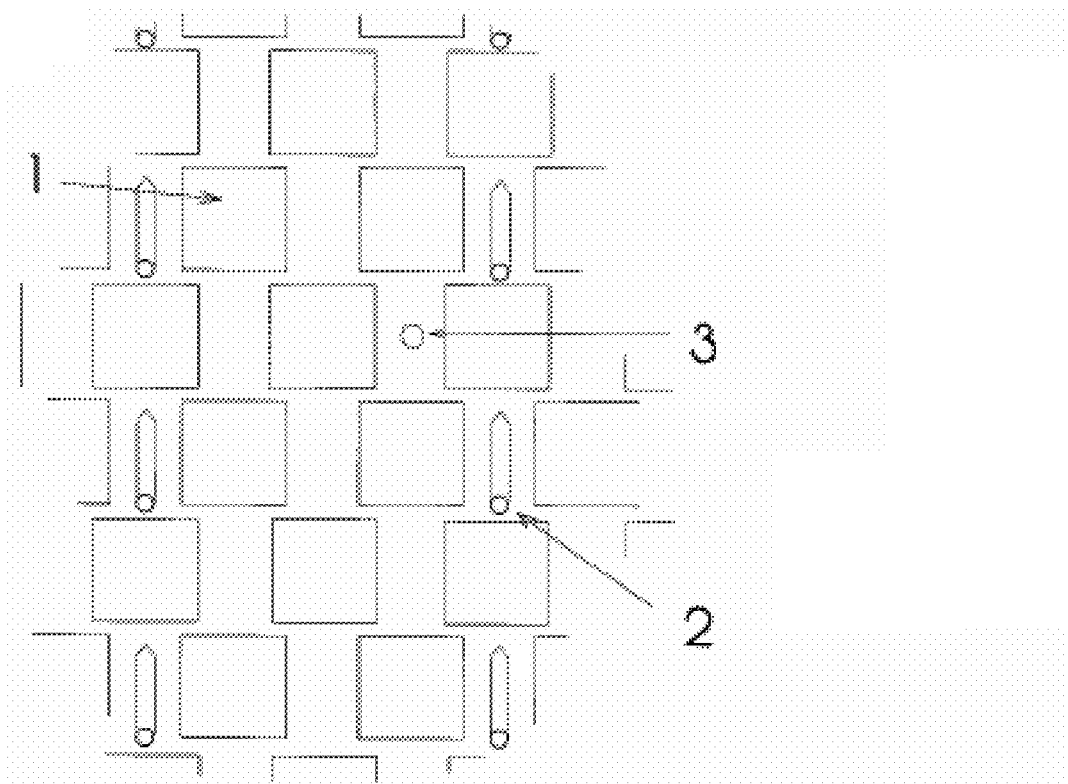
FIG. 1 depicts a first embodiment of a ventilation spacer device made in accordance with the invention, wherein the body of the device may be die punched and formed from semi-rigid sheet material.

Reference will now be made in detail to the present preferred embodiments of the invention, examples of which are illustrated in the accompanying drawings. The method and corresponding steps of the invention will be described in conjunction with the detailed description of the system.

The methods and devices presented herein may be used for maintaining a ventilation space proximate to insulation material such as thermal insulation. The present invention is particularly suited for maintaining a ventilation space proximate to fibrous thermal insulation, but may be applied to other types of insulation material.

Spaces maintained in accordance with this invention are a significant improvement over existing technology. Devices made in accordance with the embodiments herein are suitable for use in roofs and ceilings where ventilation must be maintained in order to expel heat and moisture from thermal insulation. In fact, the device is suitable for any application involving building surfaces where it is desired to maintain a ventilation space. Devices made in accordance with the invention may be used in cathedral ceilings and roof structures or in flat roof structures. Additionally, devices made in accordance with the invention may be used in roof and wall structures of buildings made of metal, such as those made from corrugated steel, aluminum and composite materials.

An air space of approximately one and one-half inches is usually recommended for effective ventilation of roofs through a spacer device made in accordance with the present invention. However, devices made in accordance with the invention can be made to provide any size air space desired. The ever-greater requirements to increase insulation values and resultant increase of insulation thickness taxes that regulated air space and requires a more substantial and positive method of maintaining the ventilation space.

Unlike devices of the prior art as described initially herein, a spacer device made in accordance with the invention (e.g., as in any of the embodiments described herein) allows thermal insulation to ventilate over its entire area. Moreover, a device made in accordance with the invention can be stored on a construction site with almost no danger of damage, deterioration or wind disbursement, as the openwork configuration permits wind to blow through the devices without moving them. In addition, materials likely to be used to make a device in accordance with the invention (e.g., plastic materials such as PVC, nylon or polyester) are tough and able to resist abuse and UV degradation. In addition, accurate and positive regulation of the insulation vent space offer the possibility of permitting a smaller recommended depth, allowing greater R values to be used, thus resulting in a savings in construction cost. In addition, if a device made in accordance with the invention is attached to insulation material, (e.g., fiberglass blankets) in the factory, the proper and correct use, even for careless or untrained installers, is ensured.

A device made in accordance with the invention can incorporate a flexible mesh or openwork with a plurality of struts attached to, and projecting perpendicularly from, the plane formed by the mesh or openwork. A gridwork backing, where provided, will be almost completely open thereby exposing the entire face of the top of the insulation to the air space to maximize the effectiveness of the ventilation.

Devices made in accordance with the invention can be delivered to the jobsite in a compact bundle of stacked units, in a roll that can be cut to the length required, or pre-attached to the insulation either rolled-up with the insulation or attached to it in straight packaging.

Though particularly advantageous when used in connection with thermal insulation, devices made in accordance with the invention may also readily be applied to insulation material used for other purposes, such as acoustical insulation. Likewise, if a gap is not needed for insulation for air circulation but for another purpose, the invention may advantageously be applied. For example, in a partition having acoustical fibrous blankets for sound-deadening, the device can be used to create a space for the pulling of wires or other flexible conduit such as certain plumbing.

As shown in the figures, devices made in accordance with the invention generally include an openwork body that is preferably slightly narrower in width than the distance between building structure framing members (e.g., joists). An openwork body can correspond to a structure wherein sufficient perforations or openings exist through the body to permit transport of air and moisture therethrough. In accordance with one embodiment of the invention, attached and generally perpendicular to the plane formed by the body is a plurality of spacing struts more or less evenly distributed along the planar surface of the body, facing away from the body. The body is placed against the insulating material with the tips of the spacing struts facing away from the insulation such that the struts contact the inside face of the building sheathing or metal wall of roof deck. Moreover, if attachment devices are placed on the opposing planar face of the body, they can anchor into fibrous insulation, facilitating alignment therewith and insulation installation.

In some embodiments, the body of the device may be arranged such that it is not immediately adjacent to the insulation. For example, if struts are arranged on both sides of the body, one set of struts may contact the sheathing or flooring. The other set of struts may either anchor into the insulation, or only press against the insulation; alternatively it can be configured to have a first portion for anchoring into the insulation, and a second portion with increased cross-sectional area for resting against the insulation and preventing penetration therethrough.

Alternatively still, two bodies may be provided, with struts creating an air space therebetween. In such an arrangement, one body rests against the sheathing or flooring, and the other body rests on the insulation.

For purpose of illustration and not limitation, a first embodiment of device made in accordance with the present invention is illustrated in FIG. 1. In accordance with this embodiment of the invention, a body is provided with an open mesh structure, where spacing struts are integral with the mesh. Specifically, a body with perforations 1 is provided and can be die cut from flexible plastic sheet, or other material. The spacing struts 2 are cut and bent (or alternatively preformed) to be oriented in a direction generally perpendicular to the perforated body 1. In accordance with one embodiment of the invention, a possible location for an attachment device to secure the device to fibrous insulating materials is indicated by reference numeral 3.

Figure 2:
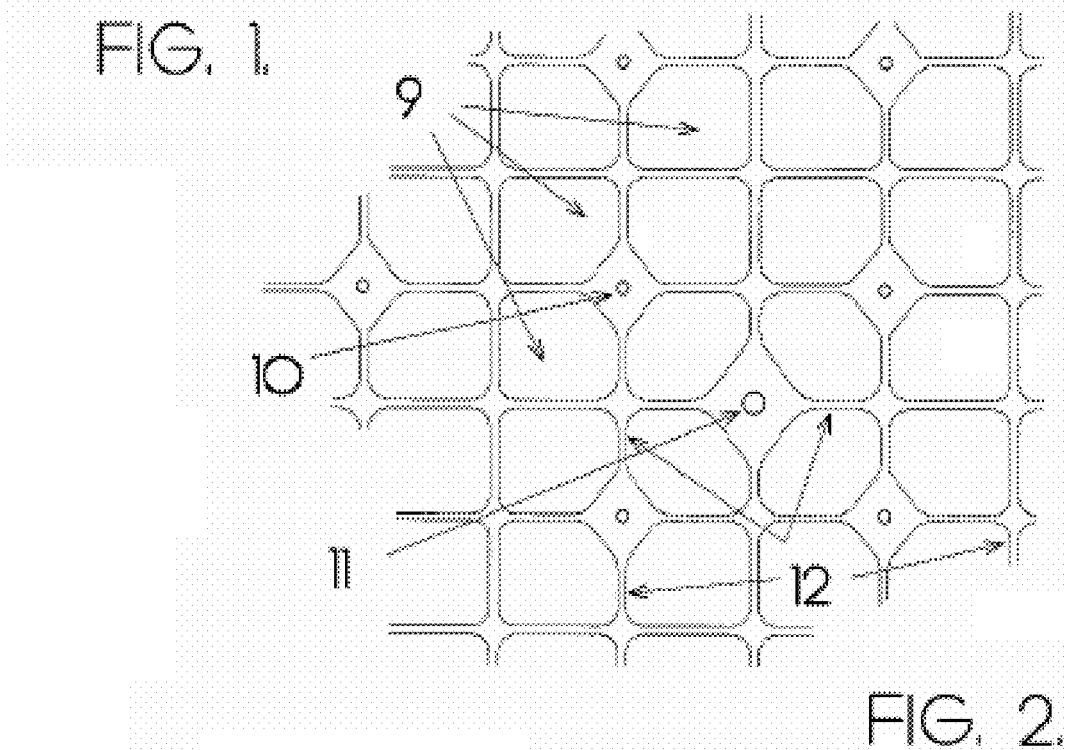
FIG. 2 depicts a second embodiment of a device made in accordance with the invention, wherein the body of the device may be cast in a mold.

The patterns of openings in the embodiments depicted in FIGS. 1 and 2 are only a suggestion of possible mesh configurations. Many configurations are possible, and within the scope of the invention. By way of example, three dimensional meshes and/or patterns based on different geometric patterns (e.g., triangles, hexagons circles, polygons, etc.) are all possible.

The struts can be manufactured by punching by a die from flexible plastic sheet along with the ventilation holes, or they can be cast-molded along with the flexible mesh body as illustrated in FIG. 2, or composed of separate strips or filaments that are fused, glued or woven to the body. Suitable materials, by way of example plastic materials, plastic coated paper or cellulose and/or metallic or composite materials can also be used. The material used should be able to maintain its rigidity under various loading, moisture and temperature conditions in order to maintain the ventilation space when in use.

FIG. 2 is a plan view of a mesh body which is cast or formed from flexible material with the spacing struts 10 integrally formed with the openwork body or formed separately and attached thereto. Openings 9 are defined by elongate filaments 12 forming the openwork body permitting ventilation therethrough. A possible attachment location 11 is also provided for an attachment device as discussed below with regard to the embodiments of FIGS. 4-5. Attachment point 11 can be, for example, a hole for insertion of a separate attachment device or an attachment device which is formed integrally with the mesh body.

Figure 3:
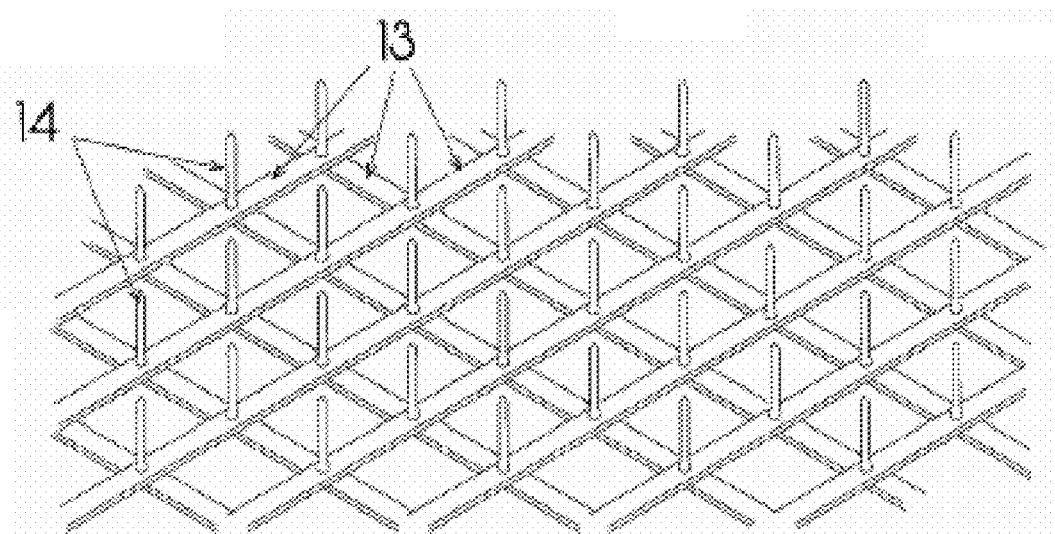
FIG. 3 depicts a third embodiment of a ventilation device made in accordance with the invention, wherein the body of the device is composed of semi-rigid strips.

For purpose of illustration and not limitation, another embodiment of the spacer device, made in accordance with the present invention, is illustrated in FIG. 3. This embodiment of the invention includes a body having flexible strips 13 assembled in a crisscross, parallelogram type orientation with spacing struts 14 acting as pivot points for the parallelogram-oriented strips. Strut pins, alternatively, may be separate from the body strips, with the struts inserted at each pivot point. This particular embodiment of the invention can provide for a device having an adjustable width that can be altered prior to installation to accommodate rafter or joist spacings of any desired dimension as shown on FIG. 9 and FIG. 10. Adjustment can be achieved by pulling or pushing laterally on the body member, causing the openwork to expand or contract respectively. For purpose of illustration and not limitation, FIGS. 9 and 10 illustrate use of a device made in accordance of this aspect of the invention and its appearance when adjusted for rafter spacings (e.g., from 12" to 24"). However, it is to be understood that other widths (both narrower and wider) are within the scope of the invention including, for example, 0.5, 1.5, 2.5, 3.0, 3.5, 4.0, 4.5, and five feet.

The strut pins shown in FIG. 11 and FIG. 12 can additionally be provided with an enlarged diameter 24 at a specific point along the shaft to allow for snap together assembly. The strut pins can also be integral to one set of strips as illustrated in FIG. 12. In accordance with this aspect of the invention, FIGS. 11 and 12 illustrate two exemplary versions of the spacer struts 22 with a bulge or "barb" 24 to facilitate assembly. FIG. 11 illustrates an independent pin that extends through two body strips (23 and 25) and FIG. 12 depicts the pin integral to a single body strip component.

It will be understood that while the spacer struts shown in FIG. 3 and in FIGS. 11 and 12 are illustrated as having the shape of round dowels, such struts can be made in any convenient shape, including that of flat strips of various widths and thicknesses, hollow tubes, bent wires, etc. All of such shapes are contemplated by the present invention.

Figure 4:
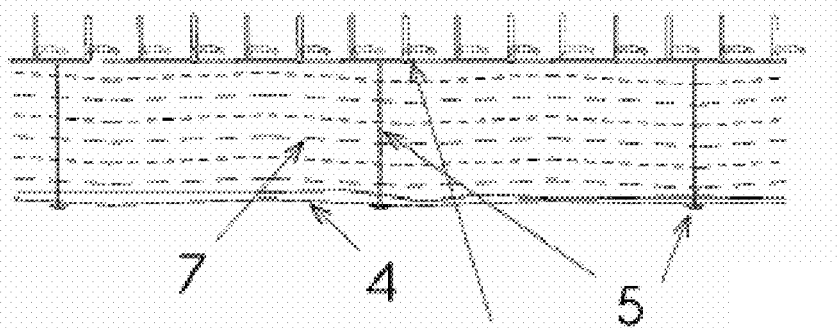
FIG. 4 is a sectional view depicting an embodiment of a device made in accordance with the invention in use, illustrating a filament technique for attachment of the device to a fibrous insulation blanket.

For purpose of illustration and not limitation, as embodied herein and as illustrated in FIG. 4, an additional embodiment of the invention is provided. FIG. 4 depicts a sectional view through an insulation batt or blanket for factory attachment of a device made in accordance with the invention (such as the device illustrated in FIG. 1 or 2) by using one or more filaments 5. The filaments 5 preferably extend entirely through the insulation mass 7 from the inner surface of the insulation batt 4 (usually made of paper or an aluminum foil and paper composite layer or a plastic material) to the device made in accordance with the invention. A button-like enlargement on the end of the filament prevents pull-out.

Figure 5:
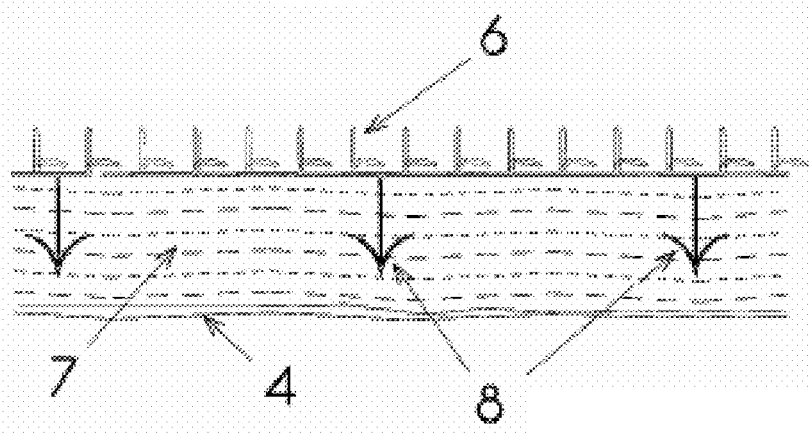
FIG. 5 depicts a sectional view of an embodiment of a device made in accordance with the invention utilizing a harpoon shaped device for attachment of the device to a fibrous insulation blanket.

For purpose of illustration and not limitation, a sectional view is provided in FIG. 5 depicting an insulation batt in combination with a device for facilitating attachment. As depicted in FIG. 5, strategically placed flexible "harpoons", integral with, or attached to the device's body, are utilized. Reference numeral 6 indicates the ventilation device with spacer struts, shown in both the deployed and bent-over positions. Reference numeral 7 indicates the fibrous insulation mass, and reference numeral 8 indicates the "harpoon" type fastening devices. Hot melt glue and other adhesives or attachment devices of other configurations could also be used to provide attachment between device 6 and the fibrous insulation material 7, as can other mechanical fasteners. For example, if the device is used with rigid foam insulation, the device can be simply screwed into the foam. If used with fibrous insulation, hooks can be applied to the side of the device adjacent the insulation to engage the fibers of the insulation, thereby attaching the components. Moreover, the openwork body can alternatively be interwoven with the fibers of the insulation batt.

For purpose of illustration and not limitation, as embodied herein, FIG. 8 depicts a transverse sectional view through several bays of roof structure and insulation illustrating an exemplary embodiment of the invention 19 demonstrating its effectiveness at maintaining a uniform air space in comparison with FIGS. 6 and 7 depicting the Rafter-Vent product. The openwork body of the device 19 exposes almost the entire insulation surface to air movement. Reference numeral 20 depicts the finished ceiling, usually made of gypsum board or plaster on lath.

Figure 13:
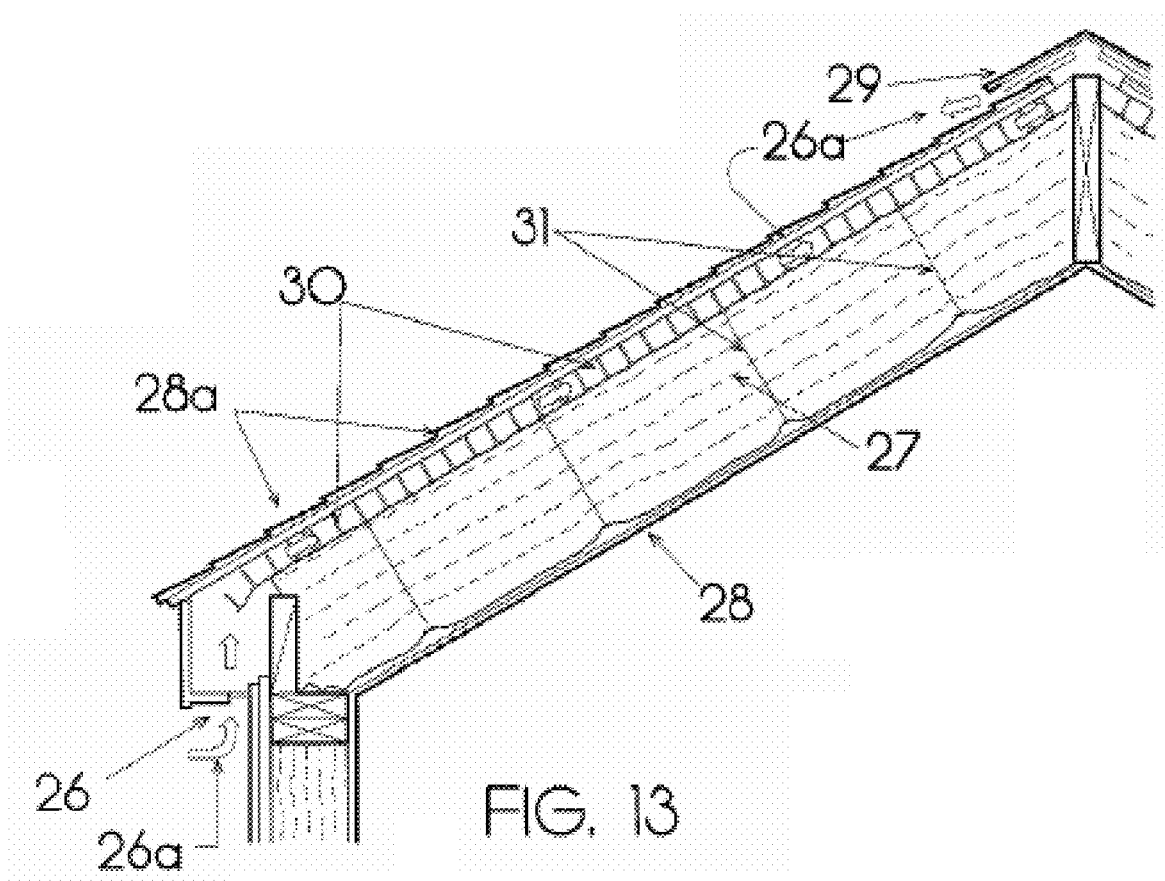
FIG. 13 illustrates a "cathedral" type ceiling roof structure utilizing a device made in accordance with the invention.

For purpose of illustration and not limitation, FIG. 13 illustrates a longitudinal section through a "cathedral" ceiling roof structure showing how an exemplary ventilation device 30 made in accordance with the invention provides continuous ventilation of the insulation 27 from the eave vent inlet 26, to a ridge vent 29 or another upper outlet device. Reference numeral 28 depicts the finished ceiling.

Figure 14:
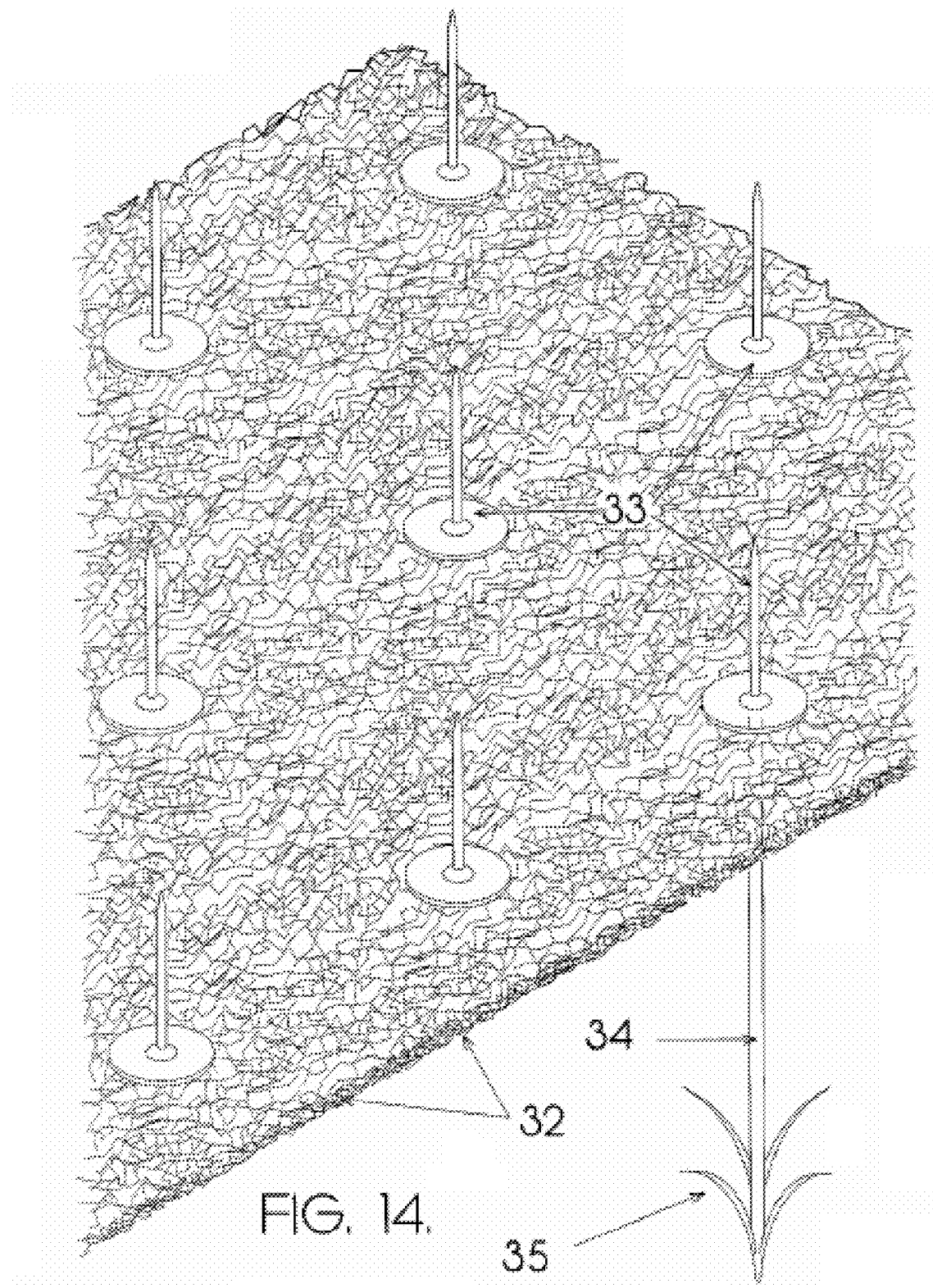
FIG. 14 illustrates a fourth embodiment of a ventilation device made in accordance with the invention.

By way of further illustration and not limitation, another embodiment of device made in accordance with the present invention is illustrated in the isometric view in FIG. 14. This embodiment of the invention is made with "entangled net technology", a commercially available product which has been rolled to a precise thickness of open mesh after disbursement of extruded plastic filaments. This embodiment, made in accordance with the present invention, has a body of "entangled net" sheet 32 with spacer struts 33 having enlarged bases for fused or glued attachment to the body. Strategically located filament or harpoon anchors are attached in similar manner to the spacer struts, but on the opposite side of the body 34, 35 for attachment of the device to fibrous insulation. These attachment methods probably would not be used where the devices are delivered to a construction site without insulation.

The "Entangled net" system is available commercially from Enka Geomatrix Systems, a Division of BASF Corporation of Enka, N.C., and its successor, Colbond, Inc. U.S. Pat. No. 4,212,692 discloses a method of forming the "entangled net" material. U.S. Pat. No. 5,960,595 and U.S. Pat. No. 6,487,826 utilize this product in areas of roof ventilation at the eave and ridge only. These patents are expressly incorporated by reference herein.

In further accordance with the invention, a method is provided. In accordance with this aspect of the invention, a device for maintaining an insulation space as described herein is provided, and thermal insulation material (preferably fibrous insulation) is also provided. The method further includes the steps of placing the device for maintaining the insulation space proximate to the insulation material, and installing the components into a structure such that the device for maintaining the insulation space is interposed between building sheathing and the insulation material to permit ventilation of the insulation. Preferably, the device is interposed between exposed thermal insulation material and the underside of roof sheathing or the underside of an attic floor. However, the device can be interposed between the thermal insulation material and wall sheathing, as desired. Any of the devices described herein can be used likewise, in accordance with the methods of the invention.

Figure 14B:
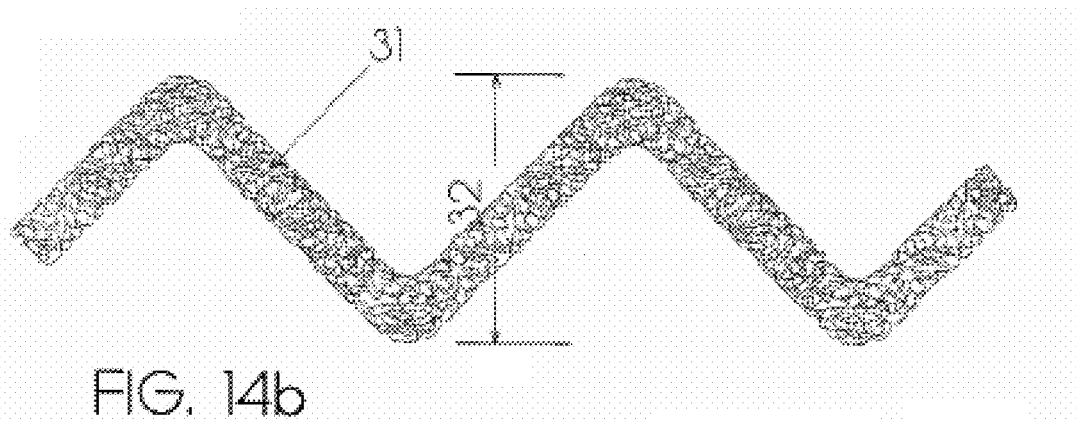
FIGS. 14(a)-14(b) illustrate a fifth embodiment of a ventilation device made in accordance with the invention using, for example, entangled net technology as described in detail below.
Figure 14A:
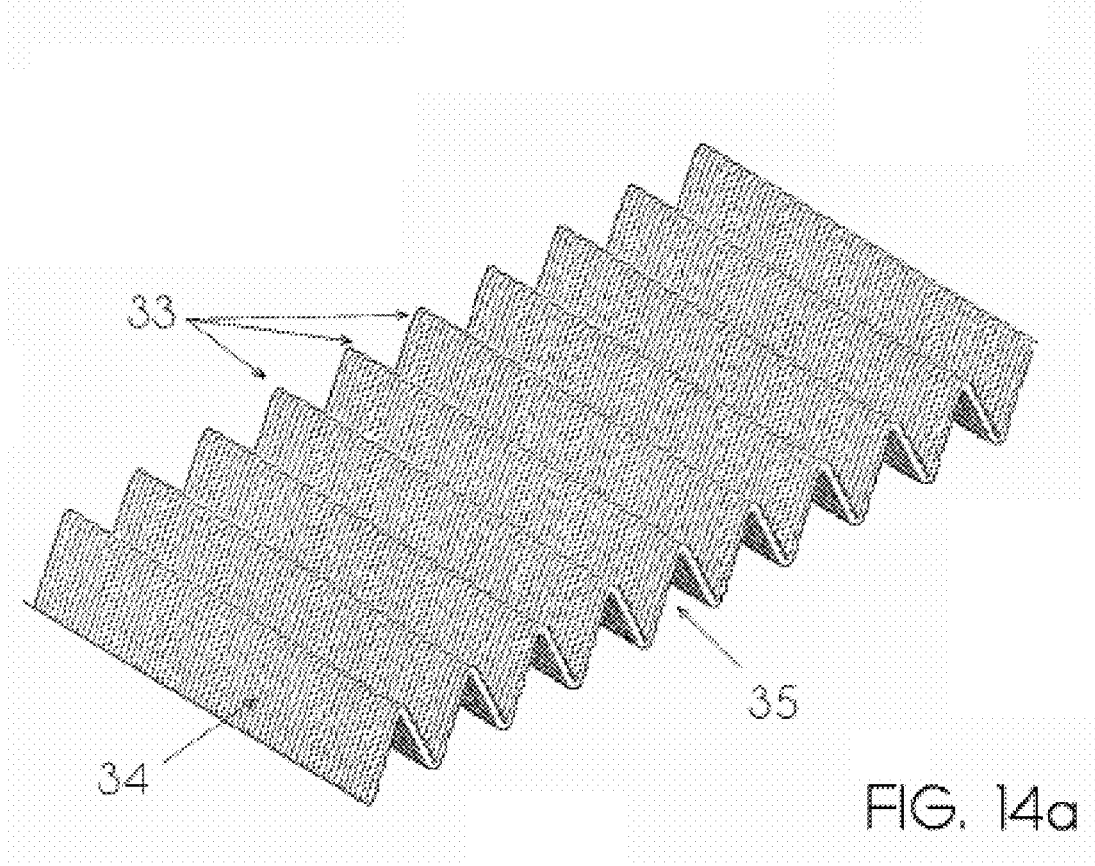

In further accordance with the invention, the embodiment depicted in FIGS. 14a and 14b may be manufactured using "Entangled net" technology as described herein or similar technology. Similar structures are disclosed in U.S. Pat. No. 6,594,965, which is incorporated by reference herein in its entirety. As illustrated in FIG. 14a, 34 indicates the device. The tips of the pleats contact the inside face of roof or wall sheathing and spaces indicated by 35 partially contact the fibrous insulation mass. The walls of the pleated form as indicated by 31 in FIG. 14b are open to allow the flow of air for ventilation of the air space defined by the device between the sheathing and insulation batt. The height of the device as indicated by 32 may be 1 to 3 inches, but preferably be approximately 1.5 inches high.

Figure 15:
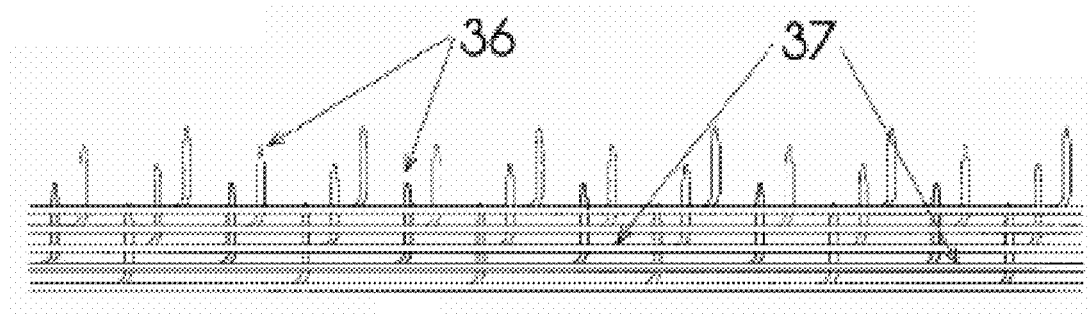
FIG. 15 depicts the nesting ability of a device made in accordance with the invention.
Figure 16:
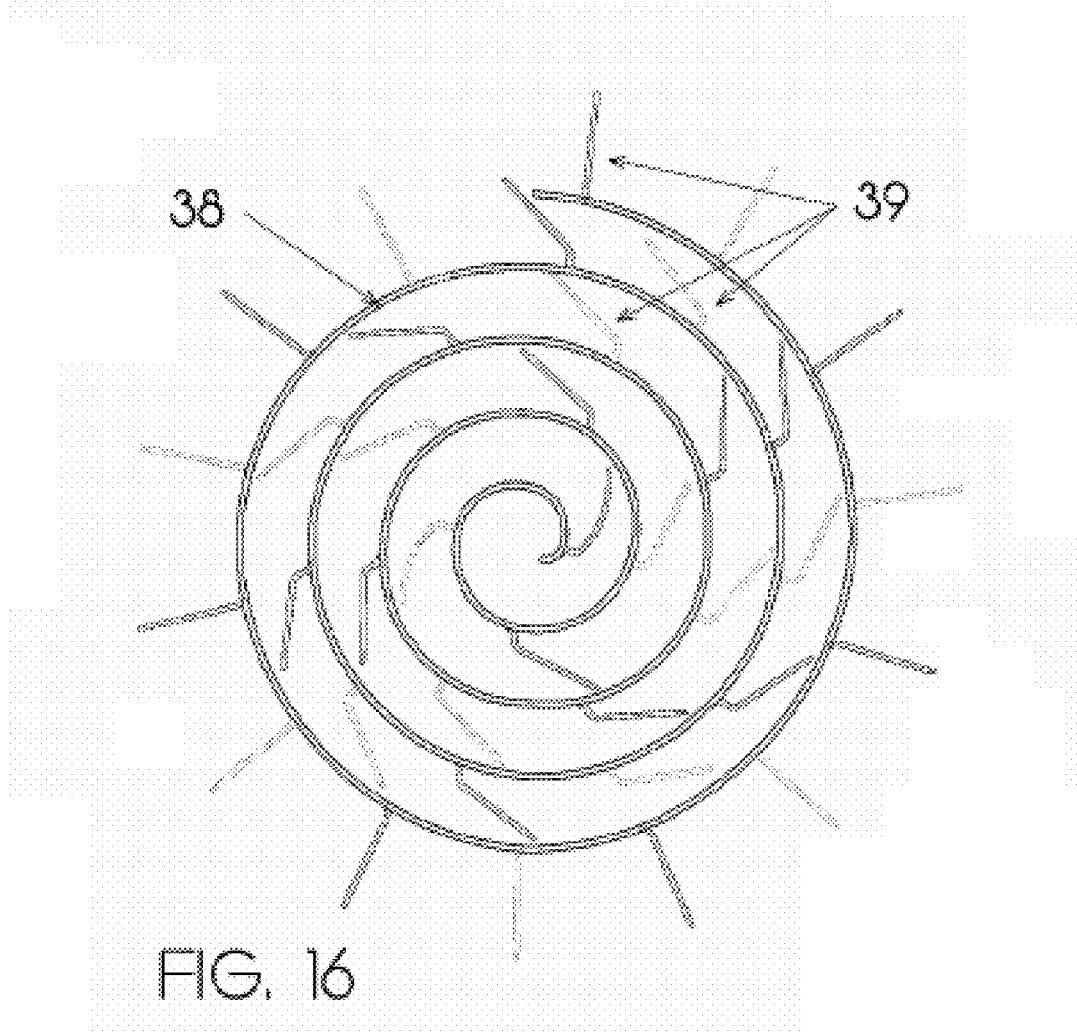
FIG. 16 illustrates the ability of a device, made in accordance with the invention, to be coiled into a roll for compact packaging or storage.
Figure 18:
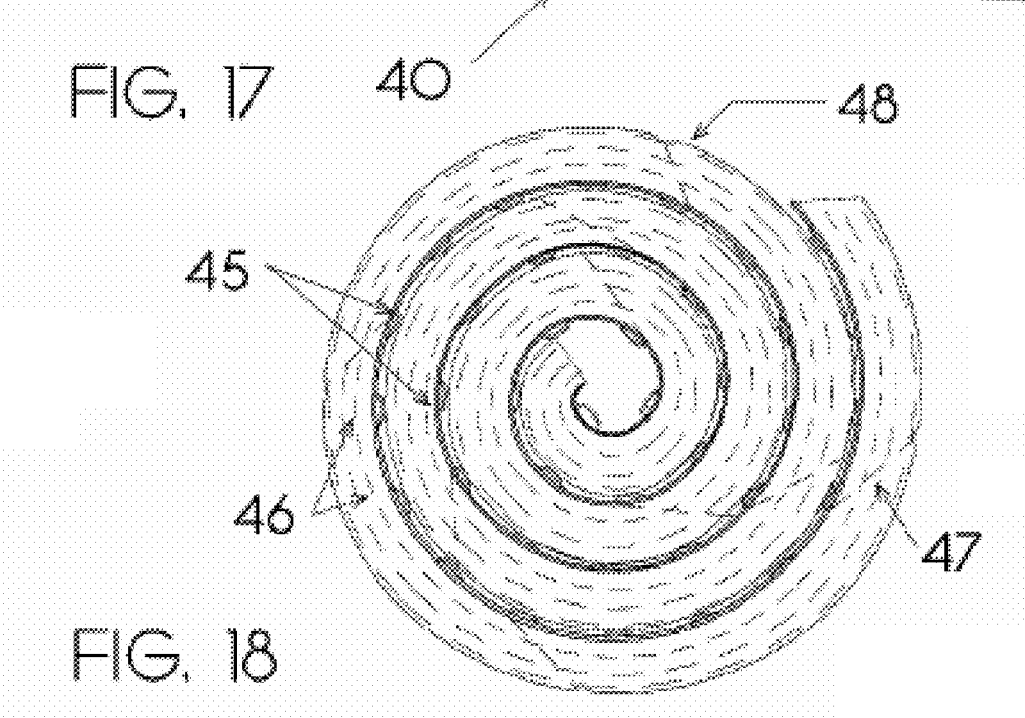
FIG. 18 illustrates the ability of a device, made in accordance with the invention when attached to fibrous insulation, to be coiled into a roll for packaging or storage.

In further accordance with the invention, the device as herein described, such as the device depicted FIGS. 1 and 2, may be bundled for storage and transportation by compressing the device body 38 and struts 39 as illustrated in FIG. 16, to minimize their profile for rolling and nesting as depicted in FIG. 15 where struts 36 align with holes in the openwork body 37. If the device is pre-attached to the insulation material as depicted in FIGS. 4 and 5, the struts can be compressed with the attached fibrous insulation material and bundled into a rolled form, as illustrated in FIG. 18. The method can alternatively or additionally include deploying the insulation material. If struts are provided on the device for maintaining the insulation space, the struts preferably deploy substantially perpendicular to the body of the device when the insulation is unpackaged by a user.

Figure 17:
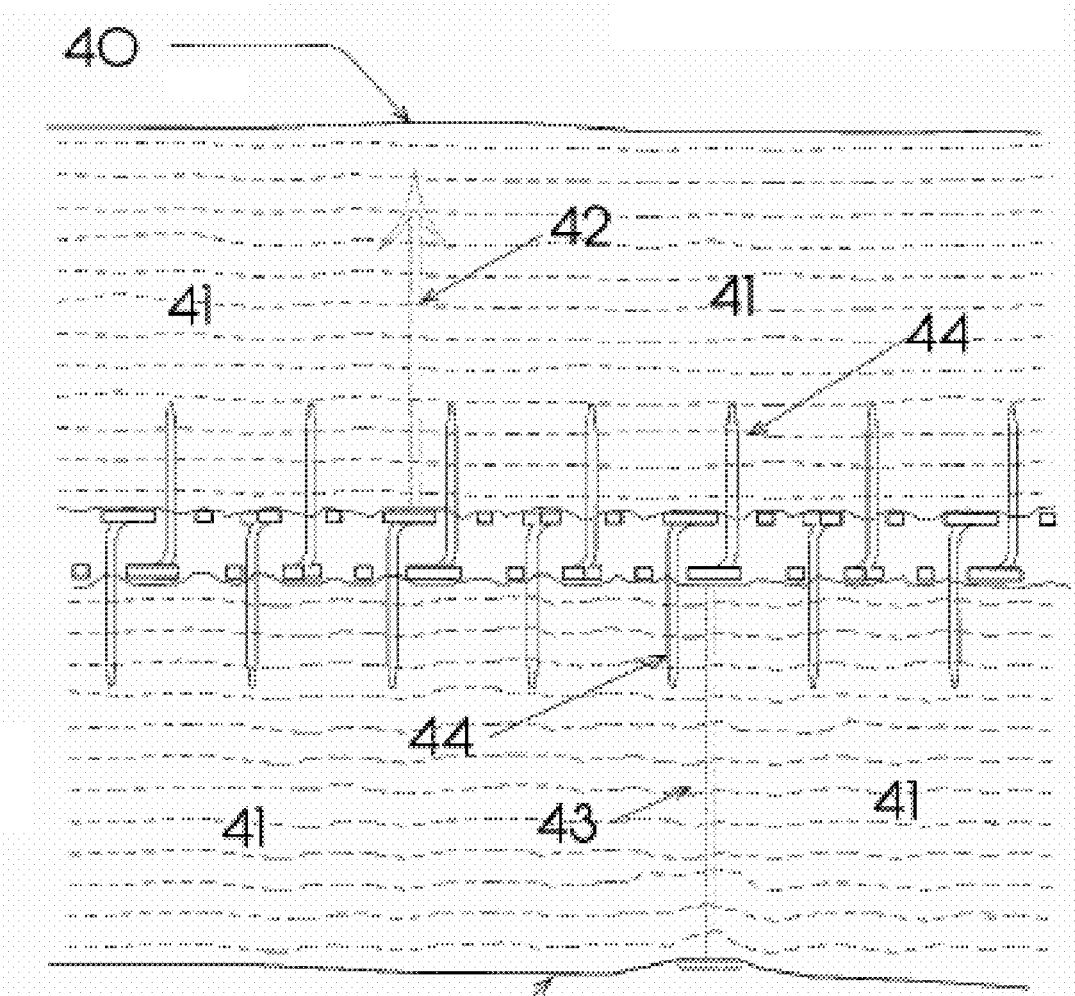
FIG. 17 illustrates the ability of a device, made in accordance with the invention when attached to fibrous insulation blankets, to be packaged or stored in a flat manner, with spacer studs facing each other.

Alternatively, the device attached to the fibrous insulation blankets as shown in FIG. 17, may be packaged in straight bundles wherein the spacer struts 44 face each other and the struts of one insulation blanket's ventilation device penetrates through the other blanket's ventilation device mesh body into the mass of the opposite fibrous blanket. Conversely, the struts of the opposing assembly do the same. This pair of blankets is compressed and packaged with a plurality of other paired sets.

Moreover, it is to be remembered that a device made in accordance with the invention can also be used wherever it is desired to maintain a ventilation space, or similar voids for other purposes, including walls of structures, interior acoustically dampened partitions, or alternative applications such as automotive, marine, aviation or aeronautical applications.

Figure 19:
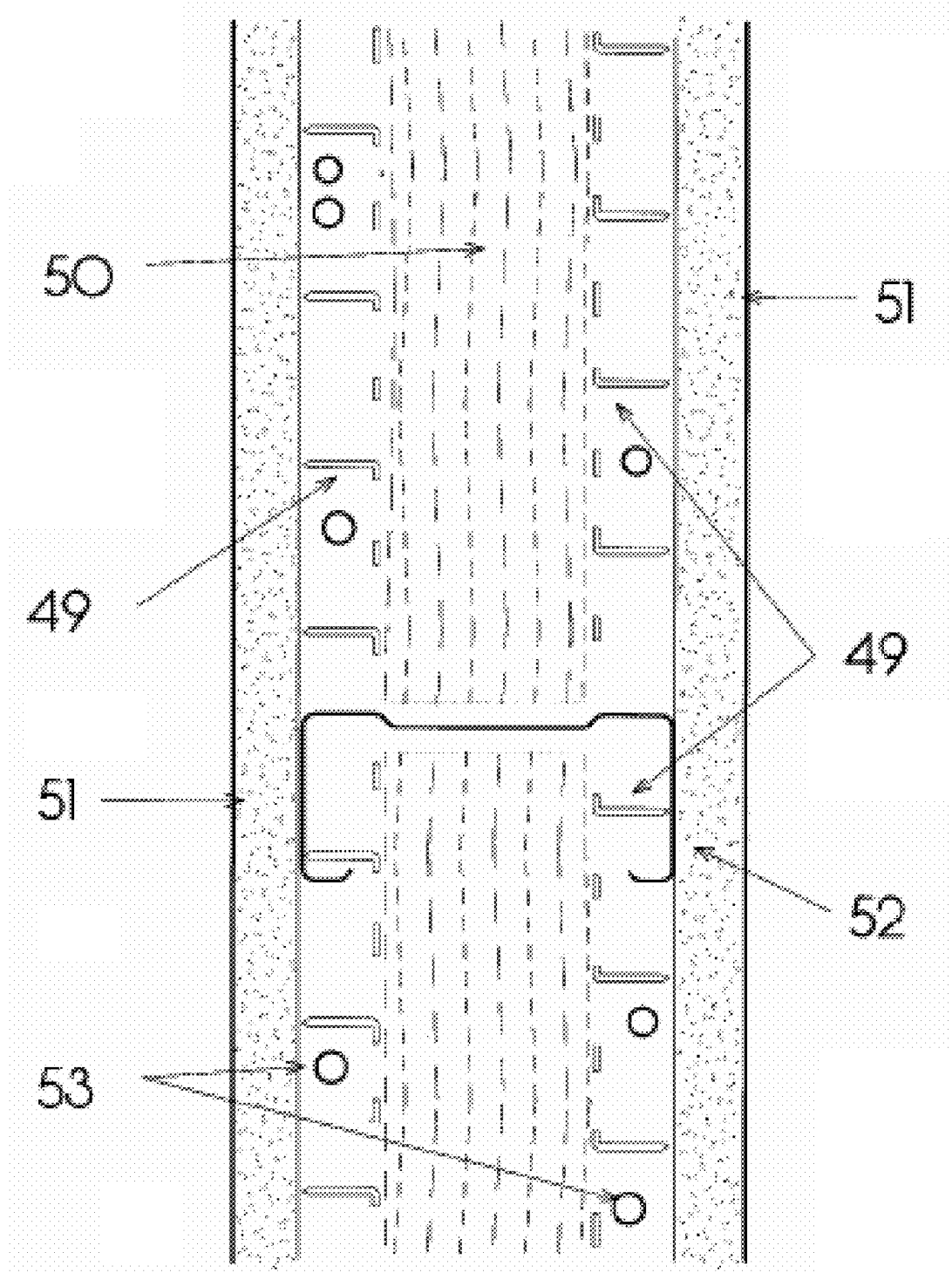
FIG. 19 is a horizontal section through an acoustically treated partition showing another use for a device made in accordance with the invention.

In FIG. 19 which illustrates a horizontal section through an acoustically dampened interior partition, illustrates the device 49 being deployed on one or both sides of the fibrous acoustical insulation 50. The points of the struts contact the inner face of the wallboard finish. 52 points to a wall framing member, and 53 indicates wiring that can easily be pulled for communication, and other purposes after the construction of the partition. Acoustical isolation may also be improved.

Figure 20:
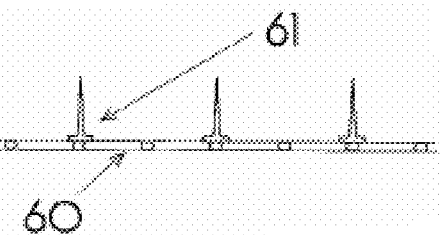
FIGS. 20-23 depict views of a sixth embodiment of a ventilation spacer device made in accordance with the invention.

For purposes of further illustration, and not limitation, FIG. 20 illustrates a sectional view through one embodiment of a system (depicted in FIGS. 20-23) made in accordance with the invention including a relatively rigid bar of struts 61 wherein the struts 61 are integral with a backing bar 66 which is attached to a an openwork such as a netting or mesh 60. The mesh 60 is preferably a flexible material. The backing bar 66 is preferably rigidly affixed to the struts 61 and is preferably made from a rigid material, such as plastic that is compatible with such mesh and capable of maintaining its rigidity in high heat roof cavity spaces. The backing bar 66 and struts 61 may be formed with the mesh 60, or may be formed separately and affixed to the mesh 60. The length of the bar 66 is preferably short enough to permit installation between rafters or studs spaced 12 inches on center without cutting the rigid backing bar. If desired, a peripheral border or strip 65 of the mesh 60 may be provided that does not include backing bar 66 to permit the mesh 60 in that region to conform to adjacent structural members.

Figure 21:
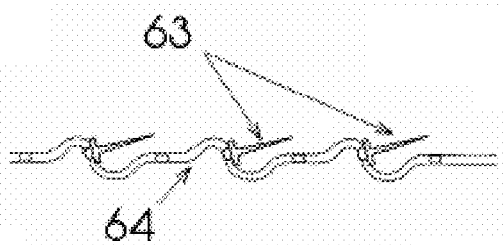
Figure 22:
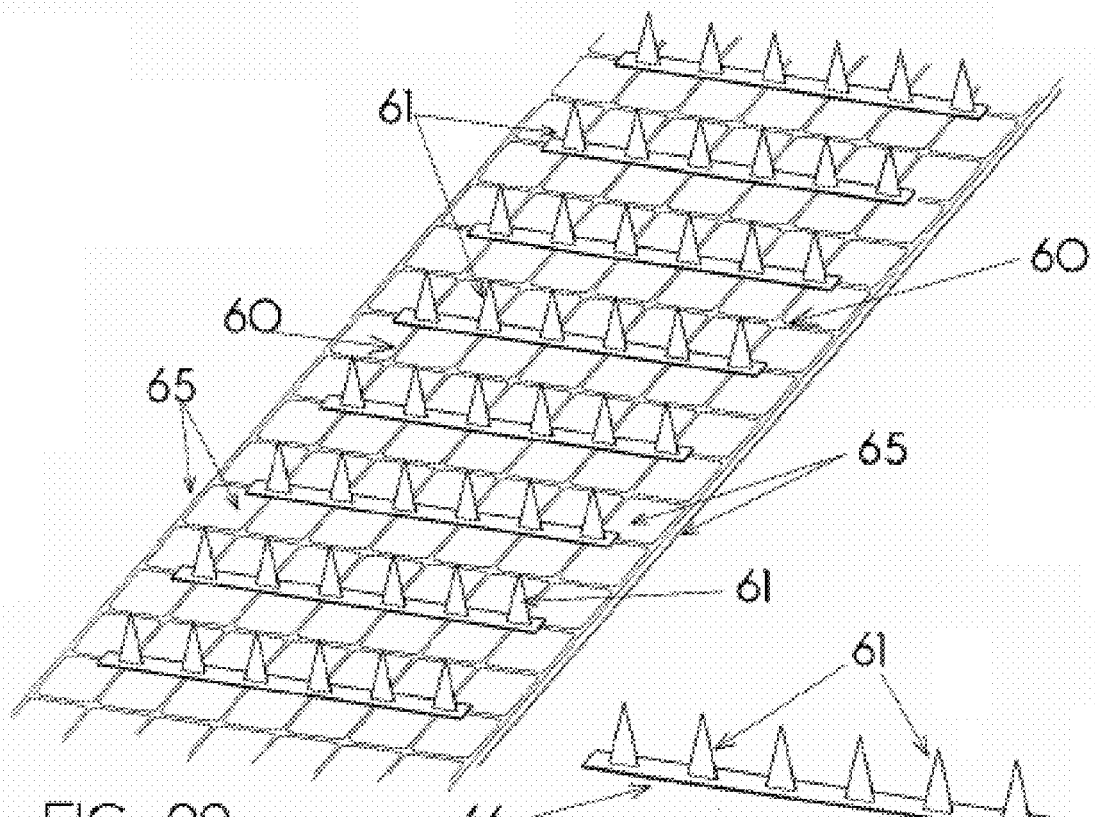
Figure 23:

As further depicted in FIG. 21, spacer struts 1 may bend over for delivery and storage in a rolled-up form either rolled-up by itself or rolled-up with fibrous or other insulation blankets. Preferably, in accordance with this embodiment, the struts are rigid and flexure occurs in the mesh 64. FIG. 22 illustrates a further view of the assembly showing a plurality of strut-bar arrays attached to the ventilation mesh 60. FIG. 23 depicts the spacer strut 61 and backing bar 66 independently from the openwork body mesh 60. Preferably, spacer strut 61 and backing bar 66 are formed from cast or molded plastic or other suitable material.

For purposes of further illustration and not limitation, FIGS. 24-26 illustrate still another embodiment of the invention.

Specifically, FIG. 24 depicts a sectional view through another embodiment of a spacer device 72 including struts 71 disposed in an openwork or mesh, 77. Struts 71 are depicted arranged generally perpendicularly to a plane defined by the mesh backing 77. Struts 71 are adapted and configured to bend over when spacer device 72 is rolled-up for storage or shipping. In this embodiment, the mesh 77 is preferably relatively more rigid and the strut 71 is preferably more flexible as compared with the earlier described embodiment depicted in FIGS. 20-23.

FIG. 25 illustrates an exemplary flexible strut 71 having a flexible portion connected to a base or mounting portion defining a recessed band 73. Preferably, strut 71 is composed of a plastic or other suitable material that is adapted and configured to withstand the high heat achieved under roof sheathing and associated compression forces caused by stuffing insulation into roof structures. The material also preferably has suitable shape memory characteristics to recover its straightened form in the time between un-rolling and deployment on the job site. In the depicted embodiment, the struts 71 may be machine-inserted into holes defined in the mesh and a recessed band 73 at the strut's base would lock it in place. FIG. 26 further depicts an isometric view of the assembly including mesh 76 and struts 71.

As further depicted in FIG. 26, not every opening defined in mesh 76 is necessarily populated by a strut 71. While mesh 76 may include a network of pre-defined holes, any desired pattern of struts 71 may be formed in these openings. As depicted, struts 71 may be deposited into the openings to form offset rows. However, as will be appreciated by those of skill in the art, any suitable pattern may be formed.

As further depicted in FIG. 26, a peripheral strip 78 of mesh 76 may be provided without struts to facilitate use of the same device in applications of different rafter or stud spacings. For example, such a mesh generally designed for use between structural members separated by 16 inches on center would typically have a width, for example of about 14.5 inches (to account for the width of the structural members). However, by not placing struts 71 in the peripheral border or strip 78, the same 14.5 inch wide device can still be fitted into an opening between structural elements separated by a distance of 12 inches on center by folding up the peripheral strips during installation. It will be appreciated that any embodiment explicitly described or incorporated by reference herein can be modified to include a peripheral strip or other region that does not include struts for such a purpose. As those of skill in the art will note, the embodiment of FIG. 22 includes peripheral strips 65 free of struts. At the same time, it will be recognized that peripheral regions free of struts, while advantageous in certain contexts, are not necessary or essential to practice of embodiments of the invention.

Figure 27:
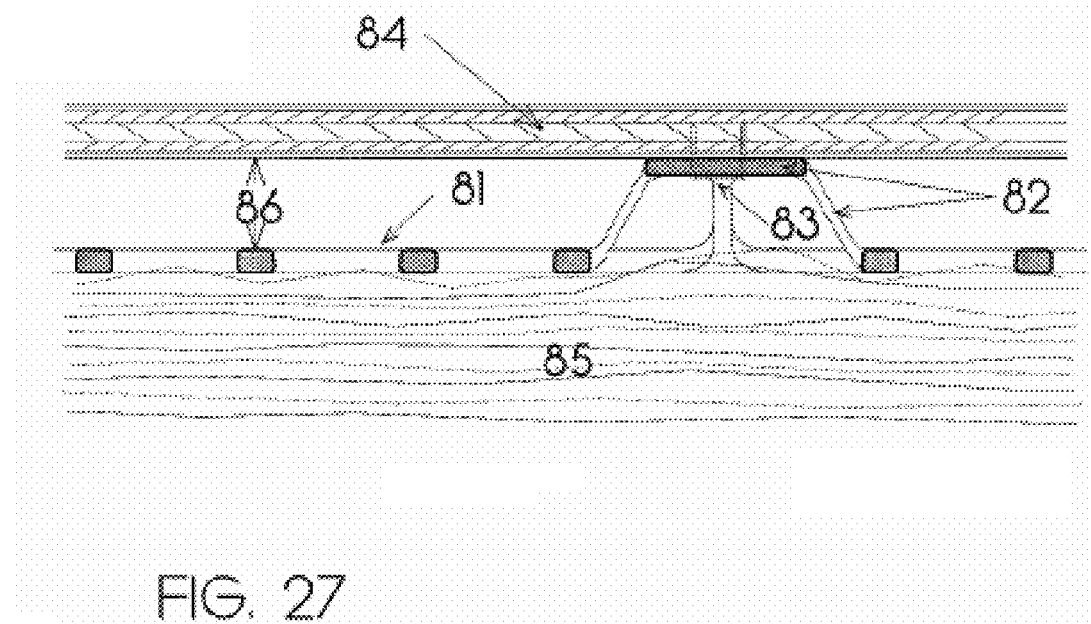
FIGS. 27-28 depict views of an eighth embodiment of a ventilation spacer device made in accordance with the invention.
Figure 28:
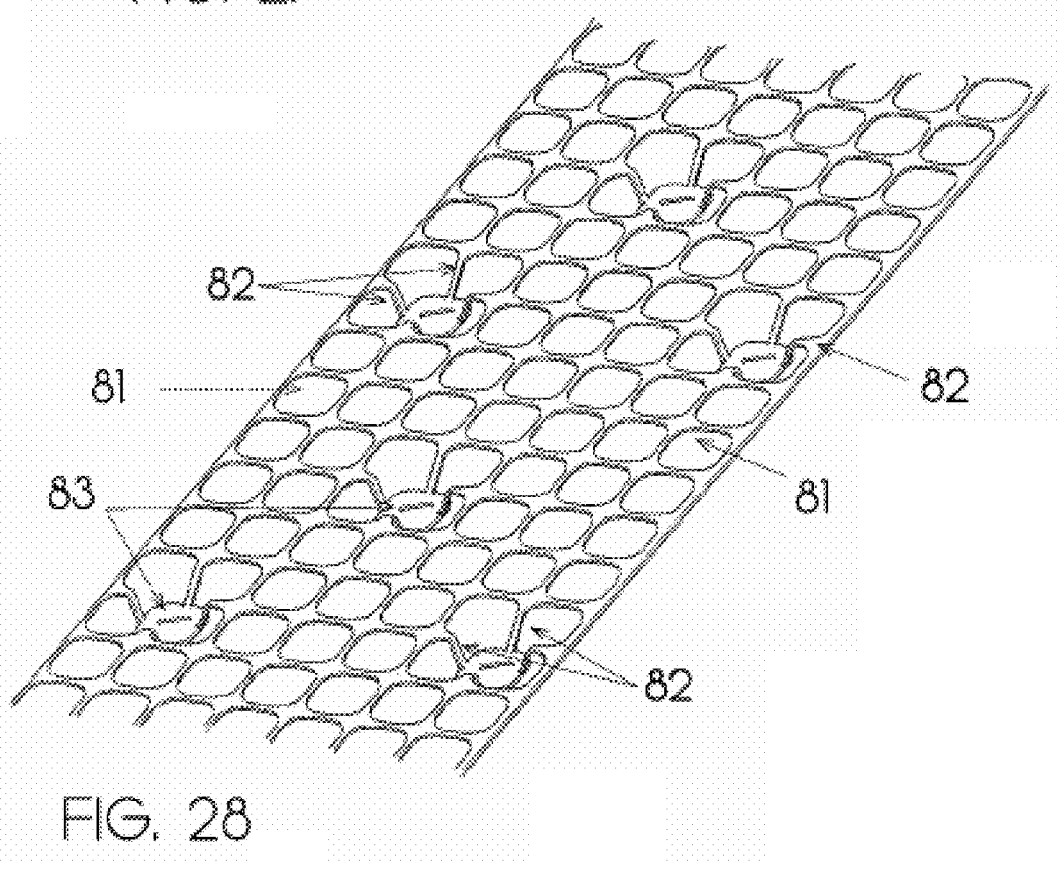

For the purposes of further illustration and not limitation, FIGS. 27 and 28 illustrate still another embodiment of the invention utilizing a flat mesh body 81 which may be made, for example, of cast or die cut plastic, or other suitable material (such as composite material). As depicted, the ventilation space defined upon installation of the device is facilitated by depressions 82 formed into the mesh with a solid portion, or land, of the material at the bottom of the depression 82 which is adapted and configured to contact the inside of wall or roof sheathing (or other surface, depending on the particular application) and facilitates the stapling or nailing of the spacer device to the sheathing. As will be appreciated, the elongate members extending from the body 81 may also simply be connected to each other, permitting a staple to be attached to the junction of the elongate members.

The depressions 82 are preferably evenly spaced along the plane of the mesh body 81. For example, approximately four or more depressions could be located in each square foot of the area of the mesh body 81. Preferably, the pattern of depressions 82 is even and repetitive to facilitate compact stacking of a plurality of such devices for purposes of storage and shipment. FIG. 27 depicts a cross section through this embodiment showing the device, 81, the formed depression 82, the fibrous insulation mass 85 and the roof or wall sheathing 84. FIG. 27 further demonstrates attachment of the spacer device into the sheathing with a staple, nail or other suitable fastener 83. FIG. 28 is an isometric view of this embodiment illustrating the perforated mesh body 81 of the ventilation device, as well as the depressions 82 and the staple or nail attachment 83.

For purposes of further illustration, and not limitation, FIGS. 29-31 illustrate how devices as described herein can be used to help ventilate exterior walls in a structure which, to the best knowledge of Applicant, have not before been ventilated as described herein.

Up to the current time, it is believed that construction has not attempted to ventilate the insulation in exterior walls, yet exterior walls can be the largest part of the envelopes of many buildings. Trapped moisture in fibrous insulation in walls has caused mold growth in houses, structural decay and has rendered the thermal properties of insulation either diminished or practically useless. It is even likely that wet insulation is a superior conductor of heat and may actually be worse than no insulation at all.

Accordingly, Applicant has concluded that there is a need for positive ventilation of fibrous insulation in order to maintain the insulation values required in new construction. It is doubtful that construction of buildings even only a year or two old have the thermal resistance as when originally constructed. Moreover, depending on building exposures, climate, and the habits of the occupants, fibrous insulation may have varied amounts of moisture. Fibrous insulation, whether made from glass, cellulose or slag, has a propensity to absorb and retain moisture. Drying this material, and keeping it dry, therefore may require that affirmative steps be taken. In modern buildings, it can generally be said that each year it takes slightly more fuel to heat or cool the building due to deteriorating insulation. That amount of fuel consumed never goes down, and only goes up, unless something is done to remedy the situation.

Techniques described herein and illustrated in FIGS. 29-31 demonstrate how an insulation spacer device as described herein may be used in association with new construction. The same principle may be applied to existing construction, with some modification. Siding and sheathing may need have to be replaced, but with the current price of fuel, there is a realistic pay-back period.

Description of Framing at Present and As Proposed

In what is commonly referred to as "platform construction", the most frequently used method of framing a building, a floor platform consisting of joists, in most cases, is covered with subflooring which usually comprises plywood or boards. This surface is then used to lay-out the exterior walls which are usually of 6" wood studs, required economically to accommodate R-19 fibrous insulation. Prior to the institution of most energy codes approximately twenty-five years ago, 4" wood studs were used for economy as insulation thicknesses were less than required by R-19. At that time there was resistance to changing to 6" studs because of increased cost due to the increased use of wood. This effectively reduced the usable size of a building with a foundation of a given size by 4" in each direction.

The use of platform construction, aside from making walls easier to build, employs shorter lengths of lumber also has one other inherent advantage. It also provides an automatic fire stop effect which did not exist in the earlier "balloon" framing method which has been used for many years, perhaps as early as medieval times. In the "balloon" method, walls were made up to three stories high in place and floor spanning members were inserted onto "ribbons" let into the sides of the vertical wall members. Among the problems with this kind of wall construction was that vertical fire spread was quite rapid due to the lack of a fire stop at each floor. Most buildings that burned did so faster than the ability of firefighters to save them. Modern balloon framing, if used, requires firestopping to be employed at floor levels.

For purposes of illustration and not limitation, as illustrated in FIG. 29, as with ordinary platform construction, the exterior wall studs 103 are laid-out on the platform of 2×6's (i.e., lumber having a nominal cross-sectional lumber dimension of two by six inches). But instead of 2×6's, the top and bottom plates 104 and 105 are formed of 2×4's (i.e., lumber having a nominal cross-sectional lumber dimension of two by four inches). The vertical 2×6 studs 103 and the horizontal 2×4 plates 104 and 105 are allowed to sit on the platform 101 so that the interior surfaces of the studs 103 and plates 104 and 105 are flush. Carpenters can then nail these members together into a complete wall structure with windows and doors framed into the wall structure as is presently done. The carpenter may then nail temporary cleats to the outside of the platform 101, and the framing 103, 104 and 105 is hoisted into place using the cleats as a pivot and to insure that the outside face of the bottom plate 105 is flush with the edge of the platform 101. This results in a framed wall where the (approximately) outer most two inches of each stud 103 stick out beyond the edge of the platform 101. The wall assembly 103, 104 and 105 is plumbed, squared and the sheathing 99 is applied. All the walls are erected in the same manner and the roof rafters 97 and attic joists or second floor joists 98 are hoisted into place and a new second floor platform is created Likewise, the exterior walls are formed and hoisted into place.

As depicted, at the outside edge of all floor platforms 101, prior to installation of wall sheathing, full 2"×2" dimensional furring 96 is installed between the tops and bottoms of all stud projections to block horizontal fire spread at the edge of floor platforms 101. Accordingly, the studs 103 in the upper and lower walls are substantially in alignment. This will result in discrete vertical channels under the sheathing closing off any horizontal paths which fire could follow.

Like the "balloon" frame described above, however, there is a potential condition in FIG. 29 where a risk of vertical fire spread exists. This can be addressed by installing a horizontally oriented strip 110 in each space between each pair of studs proximate the floor platform that expands when exposed to heat characteristic of a building fire. The strips may be preferably made at least in part from intumescent material. Suitable materials can be obtained, for example, in strip form from companies such as Technical Fibre Products and others, preferably having very high expansion ratios (www.techfibres.com/products_intumescent.htm). Device 110 can take any suitable form. For example, device 110 may be composed of a plurality of layers (e.g., 115, 116, 117) of similar materials or dissimilar materials. Preferably, the materials are all fire resistant in order to resist fire spread.

These materials and similar devices using these or similar substances as illustrated in FIG. 30 are adapted and configured to expand and seal off the vertical passage between adjacent studs proximate the floor platforms 101 to help prevent vertical fire spread. If desired, an intumescent strip 110 can be mounted on a horizontally oriented piece of furring, for example, between a half and inch and an inch and a quarter in thickness, thus reducing the gap in the vertical channel proximate the intumescent device to anywhere between about ⅛ of an inch to about half an inch. Reducing the dimension of the channel in this manner will still permit sufficient ventilation of the insulation material, but nonetheless ensure that the intumescent fire stop will work properly. Repair of a burned wall would require replacement of all parts of the wall including the intumescent device 110. The bottom edge of building framing located on the sill plate at the foundation could have another manufactured strip or vent structure 109 as illustrated in FIG. 31. This strip may contain a screen device 120 to keep out insects and valve or damper door 119 perhaps every 16" or so horizontally. The dampers are preferably configured to prevent cold air from entering the ventilation space at night and on cold days. The dampers preferably only open during the day when warming air in the walls and roof create a flow to provide the ventilation. The dampers may have a simple thermostatic spring or be opened by natural convective airflow, gravity (e.g., being weighted to bias them open or closed), by manual action, or other means. The are preferably no soffit vents present in the structure depicted in FIG. 29, and in fact the soffits and fascias as well as other enclosing eave parts would preferably be caulked tight to prevent a loss of air flow.

After erection of walls, floors and roofs and prior to installation of fibrous insulation batts or blankets 106 (or contemporaneously with such installation), a spacer device made in accordance with the present invention may be mounted, as desired, I walls, roofs and under attic subfloors.

As will be further appreciated by those of skill in the art, while the system depicted herein may be designed for placement between rafters or studs spaced 12 or 16 inches on center, the system may be sized and shaped for placement between rafters or studs of any particular spacing, such as for example: 6 inches, 18 inches, 20 inches, 24 inches, 30 inches, 32 inches, 36 inches, or 48 inches on center, among others, and may be employed in steel framed structures as well as wood framed structures. In accordance with still another embodiment, the techniques described herein can advantageously be applied in the context of premanufactured homes.

By way of still further example, the construction techniques described herein may be applied to existing structures, for example, by removing the sheathing in the structure, adding furring strips to the existing studs 103 and over the floor platforms 101 to create vertical channels along the height of the building, and modifying the soffits to create continuous flow passages from the bottom of the building up to the ridge vent. Ventilation spacers 111 can then be provided as described herein.

Horizontally oriented intumescent devices 110 can be installed proximate the floor platforms to replicate the structure depicted in FIG. 29. While such reconstruction may seem extreme initially, the removal of sheathing may be necessary to combat mold that has grown in the structure due to inadequately ventilated insulation, and it thus otherwise necessary.

The methods and systems of the present invention, as described above and shown in the drawings, provide for an insulation spacing system with superior properties to those of the prior art. Embodiments of the present invention are adapted and configured to provide superior ventilation potentially leading to decreased mold and toxic conditions and buildings, thereby benefiting the general health of the population. It will be apparent to those skilled in the art that various modifications and variations can be made in the device and method of the present invention without departing from the spirit or scope of the invention. Thus, it is intended that the present invention include modifications and variations that are within the scope of the subject disclosure and equivalents.

What is claimed is:

1. A system adapted and configured to ventilate thermal insulation in a roof structure of a building, comprising:
   a) a plurality of spaced apart rafters forming at least a portion of a roof structure;
   b) sheathing material applied to the structure proximate an outer surface of the rafters, wherein an inner face of the sheathing defines an inwardly-facing interior building surface;
   c) thermal insulation material disposed between the rafters; and
   d) a spacer disposed along substantially the entire length of the thermal insulation material and interposed at least partially between the interior building surface and the thermal insulation material, the spacer acting to define a ventilation channel between the interior building surface and the thermal insulation material, the spacer having a body defining a plurality of openings therethrough, wherein the openings are adapted and configured to permit the transfer of moisture therethrough between the insulation material and air passing through the ventilation channel to facilitate the ventilation of the thermal insulation material.

2. The system of claim 1, wherein the spacer includes a body and a plurality of struts extending from the body along the length of the body, the struts acting to separate the spacer from the interior building surface.

3. The system of claim 2, wherein the struts are deployable from a first condition wherein the strut is substantially parallel to the body to a second condition substantially perpendicular to the body.

4. The system of claim 1, wherein the spacer includes:
   a) a longitudinal gridwork body having a plurality of openings defining an openwork to allow the passage of air therethrough when placed in contact with the thermal insulation material; and
   b) a plurality of struts extending from the gridwork body, the struts being configured to maintain a predetermined distance between a first side of the insulation material and the interior building surface.

5. The system of claim 1, wherein the spacer includes:
   a) a longitudinal generally planar body having a plurality of openings defining an openwork to allow the passage of air therethrough when placed in contact with the insulation material; and
   b) a plurality of depressions defined in the generally planar body, the depressions being adapted and configured to maintain a predetermined distance between a first side of the insulation material and the interior building surface, the body and depressions acting to define and maintain a space between the first side of the insulation material and the building surface.

6. The system of claim 5, wherein each depression defined in the generally planar body of the spacer is defined by a plurality of struts, each strut having a first end and a second end, the first end of each strut being connected to the planar body and the second end of each strut being connected to a generally planar land.

7. The system of claim 1, wherein the spacer includes a plurality of barbs for anchoring into the thermal insulation material.

8. The system of claim 1, wherein the spacer includes a body made from strands of polymeric material defining openings therethrough to permit the passage of moisture to facilitate the ventilation of the thermal insulation.

9. The system of claim 8, wherein the spacer is made from entangled strands of polymeric material.

10. A system adapted and configured to ventilate thermal insulation in a wall structure of a building, comprising:
    a) a plurality of spaced apart studs forming at least a portion of a wall structure;
    b) sheathing material applied to the structure proximate an outer surface of the studs, wherein an inner face of the sheathing defines an inwardly-facing interior building surface;
    c) thermal insulation material disposed between the studs; and
    d) a spacer disposed along substantially the entire length of the thermal insulation material and interposed at least partially between the interior building surface and the thermal insulation material, the spacer acting to define a ventilation channel between the interior building surface and the thermal insulation material, the spacer having a body defining a plurality of openings therethrough, wherein the openings are adapted and configured to permit the transfer of moisture therethrough between the insulation material and air passing through the ventilation channel to facilitate the ventilation of the thermal insulation material.

11. The system of claim 10, further comprising:
    a) a first opening defined in the building structure proximate the bottom of the studs to permit fluid communication between the ventilation channel and air outside the structure; and
    b) a second opening defined in the building structure above the first opening to permit fluid communication between the ventilation channel and air outside the structure, wherein the first opening, second opening and ventilation channel cooperate to permit air outside the structure to circulate into and out of the ventilation channel to facilitate ventilation of the thermal insulation material.

12. The system of claim 10, wherein the spacer includes a body and a plurality of struts extending from the body along the length of the body, the struts acting to separate the spacer from the interior building surface.

13. The system of claim 12, wherein the struts are deployable from a first condition wherein the strut is substantially parallel to the body to a second condition substantially perpendicular to the body.

14. The system of claim 10, wherein the spacer includes:
   a) a longitudinal gridwork body having a plurality of openings defining an openwork to allow the passage of air therethrough when placed in contact with the thermal insulation material; and
   b) a plurality of struts extending from the gridwork body, the struts being configured to maintain a predetermined distance between a first side of the insulation material and the interior building surface.

15. The system of claim 10, wherein the spacer includes:
   a) a longitudinal generally planar body having a plurality of openings defining an openwork to allow the passage of air therethrough when placed in contact with the insulation material; and
   b) a plurality of depressions defined in the generally planar body, the depressions being adapted and configured to maintain a predetermined distance between a first side of the insulation material and the interior building surface, the body and depressions acting to define and maintain a space between the first side of the insulation material and the building surface.

16. The system of claim 15, wherein each depression defined in the generally planar body of the spacer is defined by a plurality of struts, each strut having a first end and a second end, the first end of each strut being connected to the planar body and the second end of each strut being connected to a generally planar land.

17. The system of claim 10, wherein the spacer includes a plurality of barbs for anchoring into the thermal insulation material.

18. The system of claim 10, wherein the spacer includes a body made from strands of polymeric material defining openings therethrough to permit the passage of moisture to facilitate the ventilation of the thermal insulation.

19. The system of claim 18, wherein the spacer is made from entangled strands of polymeric material.

* * * * *